US006719434B1

(12) United States Patent
Finn et al.

(10) Patent No.: US 6,719,434 B1
(45) Date of Patent: *Apr. 13, 2004

(54) FOLDABLE LIGHT DIFFUSION BOX WITH FRAME ASSEMBLY

(76) Inventors: Bruce L. Finn, 3413 Rambla Pacifico, Malibu, CA (US) 90403; Robert E. Lee, 116 Mohawk, Topanga, CA (US) 90290

( * ) Notice: Subject to any disclaimer, the term of this patent is extended or adjusted under 35 U.S.C. 154(b) by 196 days.

This patent is subject to a terminal disclaimer.

(21) Appl. No.: 09/704,639

(22) Filed: Nov. 1, 2000

Related U.S. Application Data

(63) Continuation-in-part of application No. 09/642,315, filed on Aug. 21, 2000, now Pat. No. 6,588,912, which is a continuation of application No. 09/146,063, filed on Sep. 2, 1998, now Pat. No. 6,106,125.

(51) Int. Cl.[7] ............................................... G03B 15/07
(52) U.S. Cl. ........................ 362/11; 362/355; 362/367
(58) Field of Search .......................... 362/11, 355, 367, 362/236, 237, 330, 317, 351, 362, 368, 372, 227, 240, 352, 358, 360, 7, 8, 16, 18, 235, 238, 239, 244, 246, 249, 250, 374, 375, 404, 408

(56) References Cited

U.S. PATENT DOCUMENTS

| 3,311,745 A | * | 3/1967 | Gossner | 362/227 |
|---|---|---|---|---|
| 3,509,334 A | | 4/1970 | Michailov | 240/81 |
| 4,295,187 A | | 10/1981 | Shemitz | 362/352 |
| 4,409,646 A | | 10/1983 | Baliozian | 362/319 |
| 4,428,030 A | | 1/1984 | Baliozian | 362/18 |
| D272,656 S | | 2/1984 | Parker | D26/65 |
| 4,446,506 A | | 5/1984 | Larson | 362/17 |
| 4,490,776 A | | 12/1984 | Kluch | 362/16 |
| 4,504,888 A | | 3/1985 | Rosenthal | 362/18 |
| 4,616,293 A | | 10/1986 | Baliozian | 362/7 |
| 4,707,766 A | | 11/1987 | Bertozzi et al. | 362/11 |
| 4,719,545 A | | 1/1988 | Cano | 362/240 |

(List continued on next page.)

FOREIGN PATENT DOCUMENTS

GB  2223565 A  4/1990  ............. F21V/1/14

OTHER PUBLICATIONS

*Chimera News*, vol. 18, No. 1, Chimera Photographic Lighting, 6–page newsletter, Boulder, Colorado, Jun. 1998.
*Chimera Product Catalog*, Chimera, Boulder, Colorado, May 1997.
International Cinematographers Guild Magazine, Vo. 70, No. 10, Oct. 1999, pp. L20–L21 Article by Bruce Finn.

(List continued on next page.)

*Primary Examiner*—Alan Cariaso
*Assistant Examiner*—Ismael Negron
(74) *Attorney, Agent, or Firm*—Cislo & Thomas LLP

(57) ABSTRACT

A lighting project or device has a housing having multiple adjacent sides and a front, the housing being enclosed at least between par lamp and the diffusion element. Multiple par lights are mounted to a frame and positioned to send light out the front of the device. The box also has a diffusion element (frame) disposed proximate its front end, and even may have multiple elements preferably spaced apart. The element or elements receive the light from the par lighting instruments and diffuse it to provide a soft projected light from the device. In accordance with one aspect of the invention, this light may be used to provide diffused light as part of the key lighting for a stage or set, and may provide such soft projected lighting from a front (downstage) of the stage or set. The frame also supports the housing. The frame may be rectangular. The device may also have a soft shell, may hang overhead, on a stand or by a rotatable yoke, and may have lights fixed therein. The device may also have a rear cover.

84 Claims, 30 Drawing Sheets

U.S. PATENT DOCUMENTS

| | | | | |
|---|---|---|---|---|
| 4,757,425 | A | 7/1988 | Waltz | 362/18 |
| 4,788,628 | A | 11/1988 | Farrall | 362/18 |
| 4,855,874 | A | 8/1989 | Waltz | 362/16 |
| 4,998,189 | A | 3/1991 | Guggemos | 362/278 |
| 5,128,838 | A | 7/1992 | Brandess | 362/18 |
| 5,311,409 | A | 5/1994 | King | 362/17 |
| 5,651,602 | A | 7/1997 | Tawil et al. | 362/18 |
| 6,106,125 | A * | 8/2000 | Finn et al. | 362/11 |

OTHER PUBLICATIONS

"Box Theory," ICG International Cinematographers Guild Magazine, Hollywood, California, Oct. 1999 (2 pages).

6,000 Watt Molequartz® Six–Light Molepar®, Type 5761, Product Flyer, Hollywood, CA, Jun. 1996.

6,000 Watt Six–Light Overhead Cluster (COOP), Type 20133, Product Flyer, Hollywood, CA, Sep. 1996.

2,000 Watt Molequartz® Spacelight, Type 7271, Mole–Richardson Lighting Catalog, Hollywood, CA, Jun. 27, 2002.

Lights Up Industries Website excerpts, Los Angeles, CA, Jun. 12, 2002.

The Fisher Light®, Website Excerpts, Fisherlight, North Hollywood, CA, Aug. 16, 2002.

Kinoflo Website Excerpts.

Broncolor Website Excerpts.

"Dino–Light, Multi–Light, Mini–Brute" from Licht–Technik Vertriebs GmbH of Munich, Germany Website Excerpts, Jul. 12, 2002.

Plume Website Materials, Jul. 12, 2002.

Photoflex Website Materials, Jul. 12, 2002.

* cited by examiner

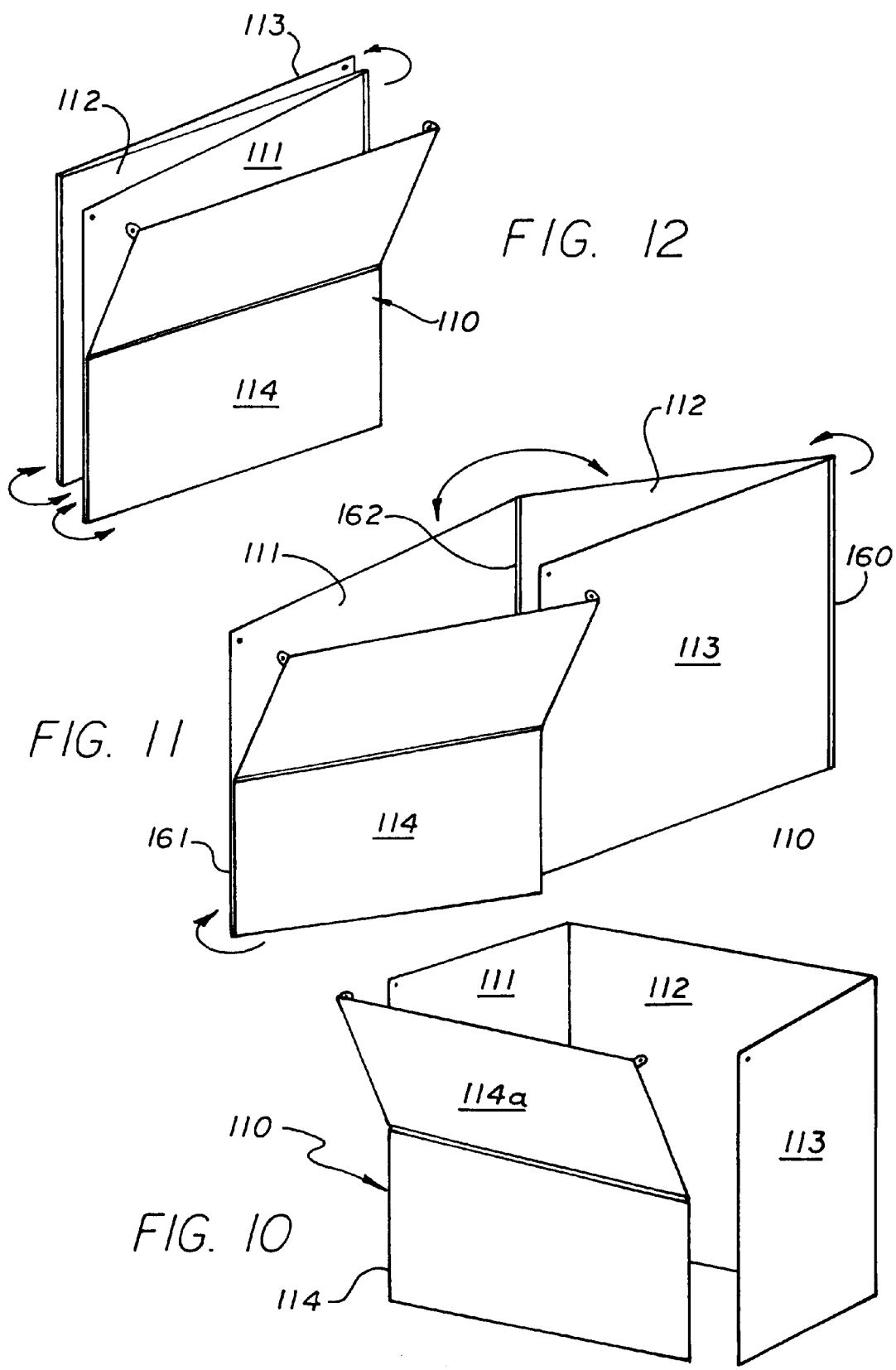

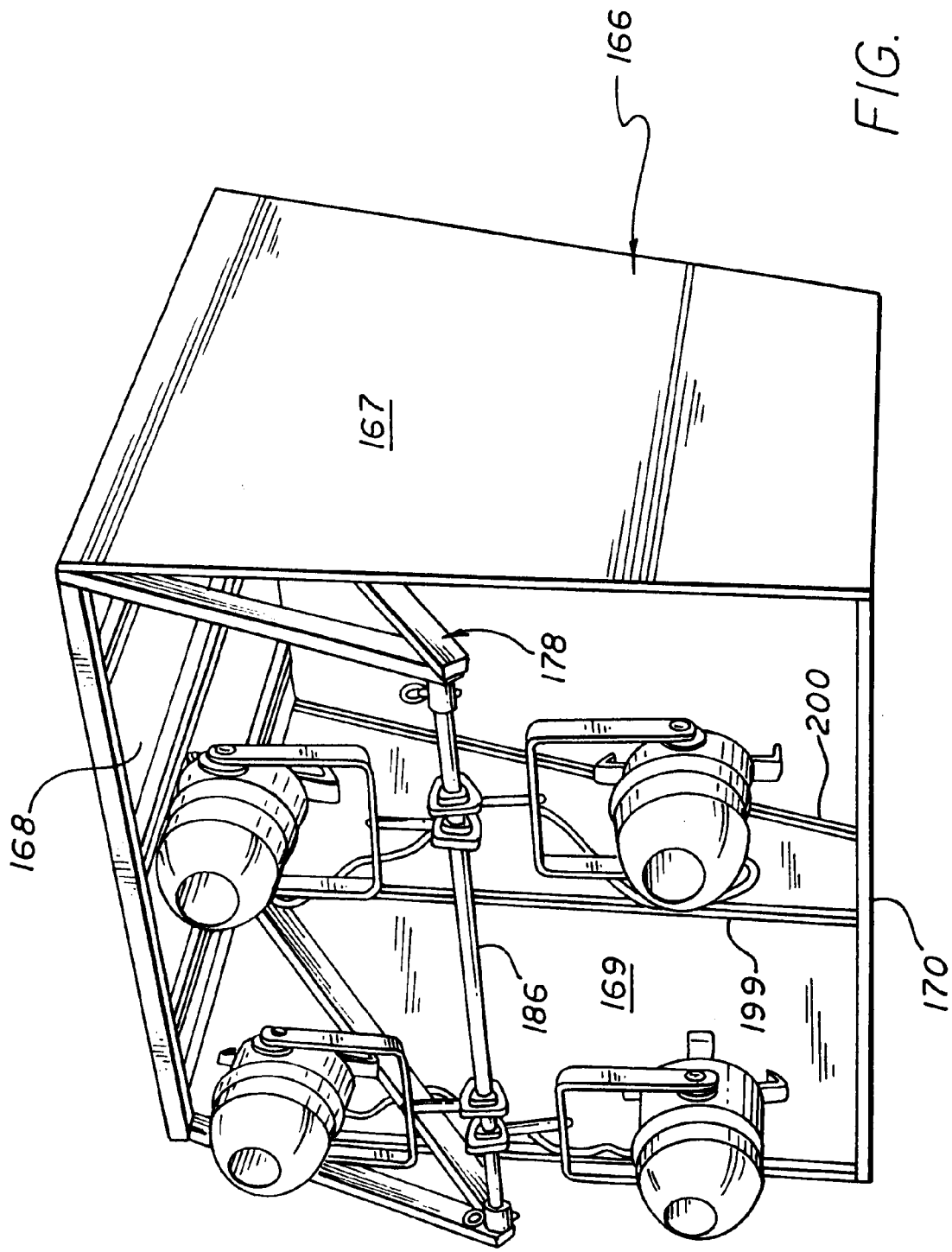

FIG. 34
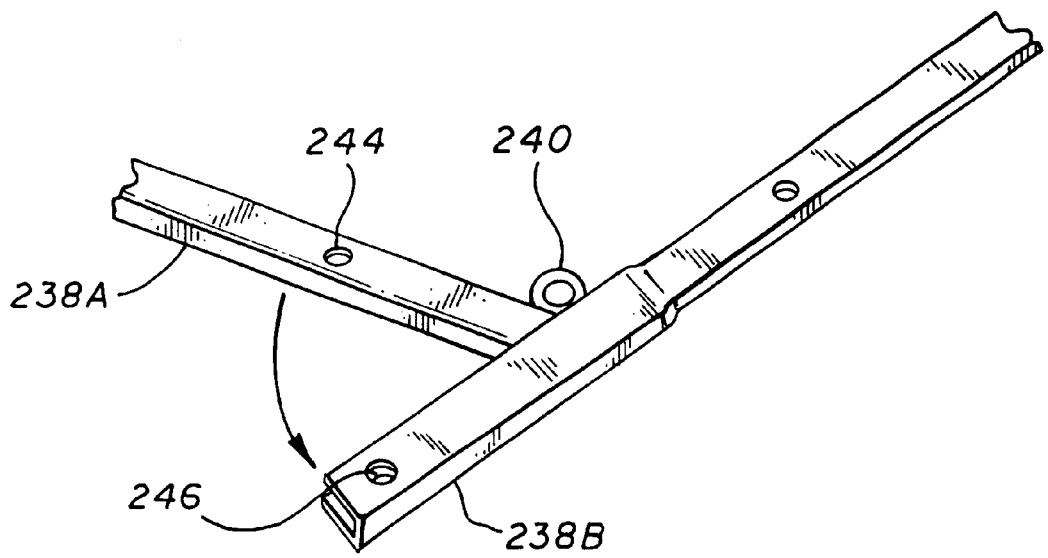
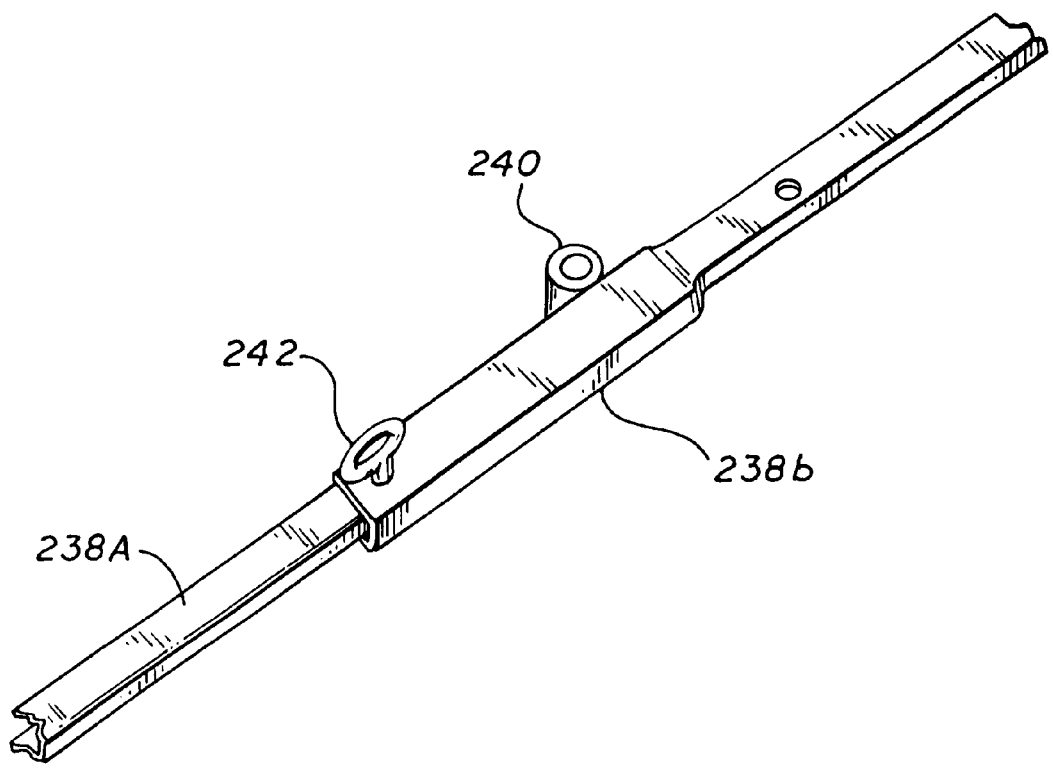
FIG. 34A

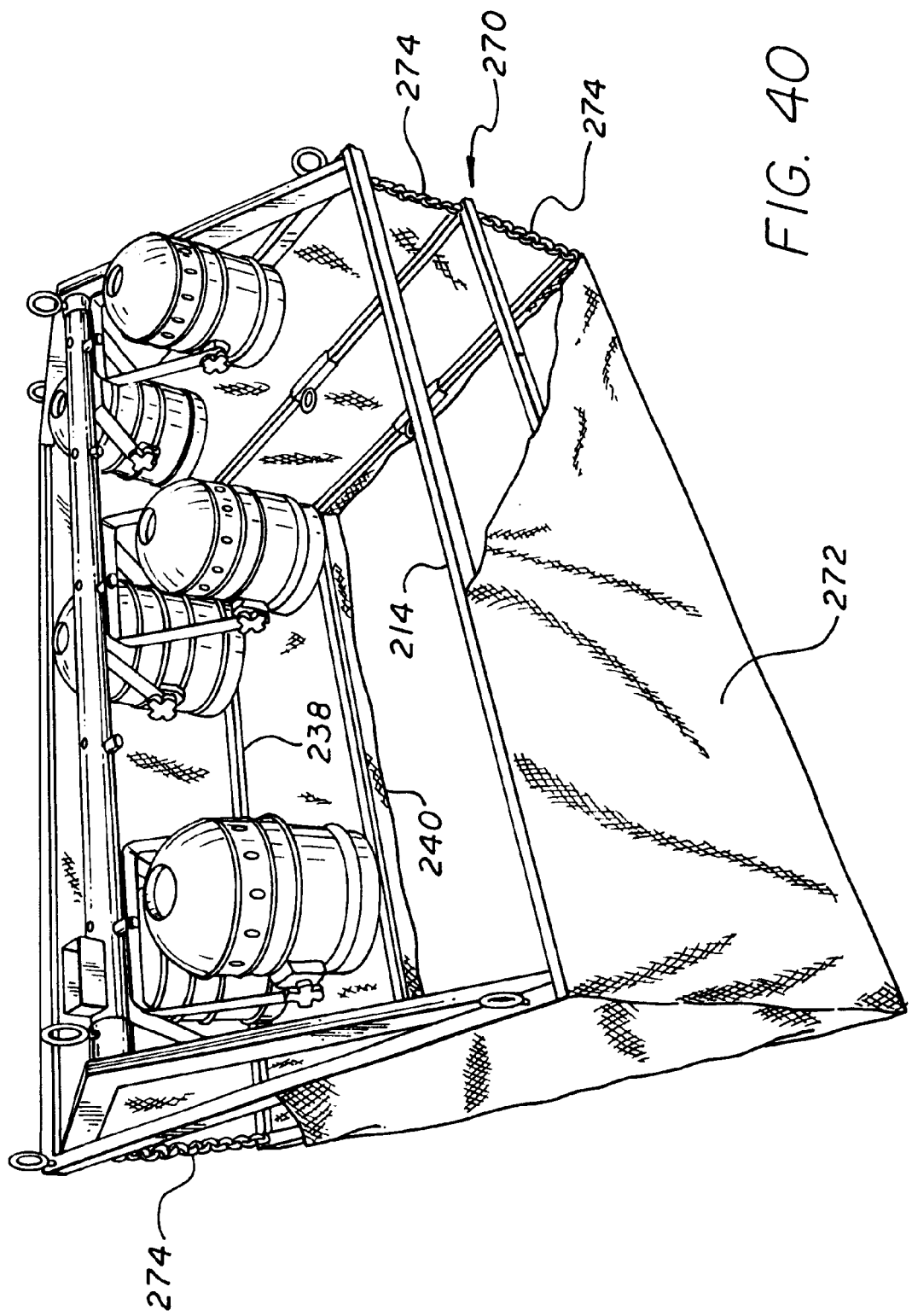

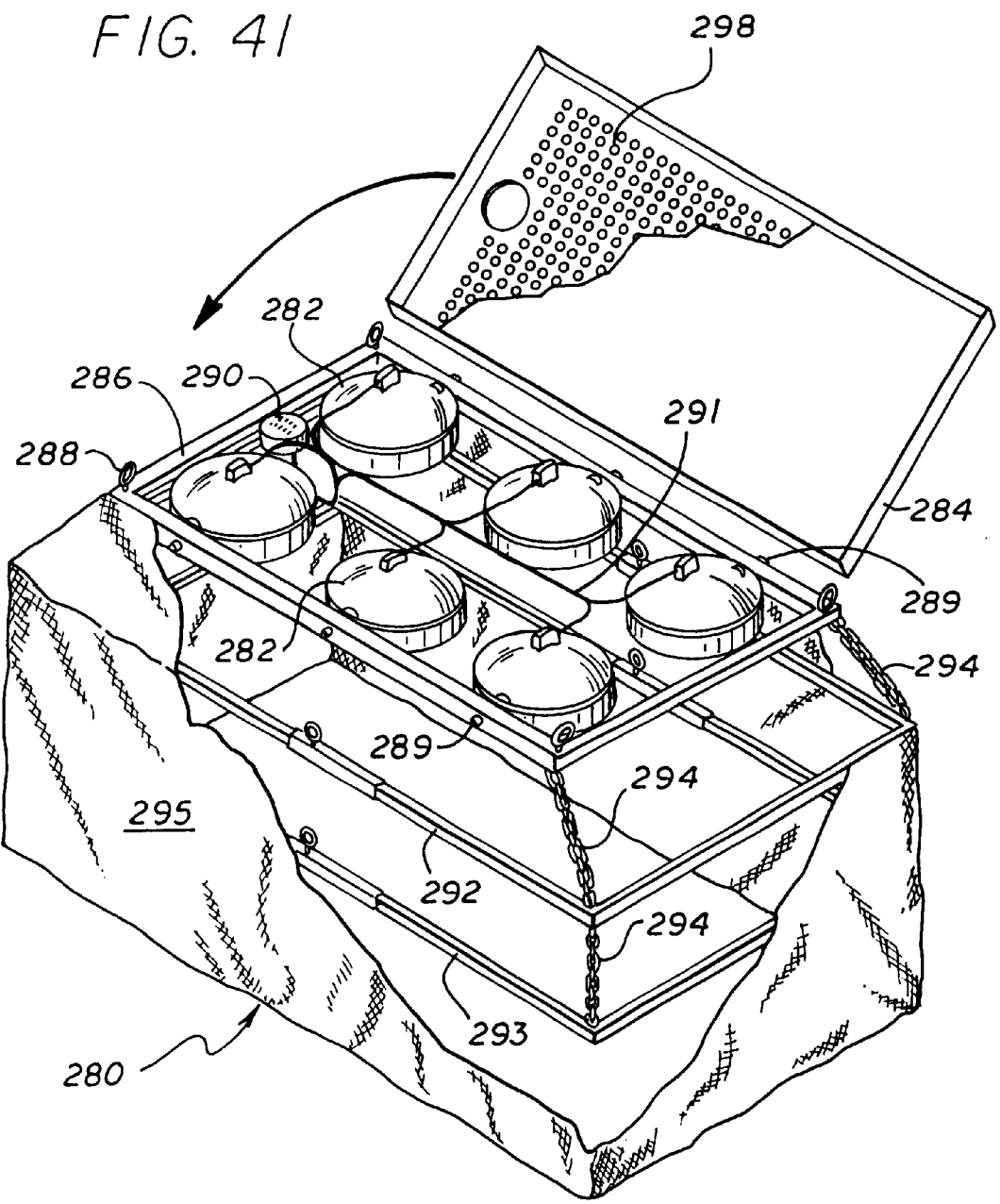

FOLDABLE LIGHT DIFFUSION BOX WITH FRAME ASSEMBLY

CROSS-REFERENCE TO RELATED APPLICATIONS

This application is a continuation-in-part of U.S. patent application Ser. No. 09/642,315, filed Aug. 21, 2000 now U.S. Pat. No. 6,588,912, which is a continuation of U.S. patent application Ser. No. 09/146,063, filed Sep. 2, 1998, now U.S. Pat. No. 6,106,125.

BACKGROUND OF THE INVENTION

The present invention relates to a portable modular light diffusion box, and in particular such a box which includes light diffusion frame(s) and the capacity to contain multiple lights.

In the entertainment industry including motion pictures, television and theatrical arts, as well as in the photographic industry and other fields, it is necessary to light a set, stage or other area. Often, particularly for an indoor set in the motion picture and television industries, the key (primary) lighting is provided at the back corners of the set (opposite where the camera and audience, if any, will be) to avoid boom (sound equipment) shadows and a fill light from the front in accordance with a theory known as back cross key lighting.

While back cross key lighting is used in almost all sitcoms, there are some inherent drawbacks to the system. One problem is that the "key" or strongest light comes from the top/back (upstage) portion of the set, so there are invariably shadows thrown from the people and objects on the set onto each other. Also, in many cases there are shadows from a person's facial features that fall upon that person's face, such as nose shadows. The strong ("hard") light coming from the back also creates hot rims around people and is especially objectionable on bald or light-haired individuals. This hard light, which is traditionally used, can also create unwanted microphone boom shadows.

In studio photography, light diffusion gel frames have been used to soften lighting by diffusing the light. These frames have been typically individually mounted in front of or to a lighting instrument.

Conventional wisdom is that the lights are mounted on a stand, on a pipe, or on typical set scaffolding known as a green bed. As there are numerous lights on a set, and as providing a diffusion screen on each light is cumbersome, and as it is further cumbersome to change such screens and to align such lights to properly cooperate, the use of individually mounted diffusion devices is not practical or economical for some set lighting, especially sitcoms.

Examples of individually mounted diffusion gel supporting members are shown in U.S. Pat. No. 5,651,602 to Joseph N. Tawil, issued Jul. 29, 1997, and U.S. Pat. No. 4,446,506 to Raymond G. Larson issued May 1, 1984. These require special brackets or rings to mount to the lighting instrument, and are often dependent on the type of light.

A diffusion device has been known to be used with multiple lights, such as in U.S. Pat. No. 4,855,874 to Thomas A. Waltz issued Aug. 8, 1989. The Waltz patent discloses a light modifier which is inflatable and surrounds multiple lights attached to a stand or to other support rods which are not part of the inflatable device. The device itself which provides light diffusion must be entirely changed to change the light diffusion effect, and it has limited ability to control and direct light. It is therefore impractical to use for set lighting.

U.S. Pat. No. 5,128,838 to Muriel H. Brandess issued Jul. 7, 1992, discloses a photographic filter-holding apparatus that has a mechanism for holding a filter in front of a light. In one embodiment there are two lights, but each light has a separate filter, and it also requires a special mounting structure.

Even when diffusion is used, often expensive fresnel lights are used with it. These are focusable between "spot" and "flood" conditions, and provide a useful light source because you can change the pattern and intensity of the light when it is not heavily diffused, allowing for a tight "spot" of hot light, a wide flood of lesser intensity, or a selectable middle ground. It is interesting to note that when projected through heavy diffusion, this function is neutralized. However, fresnel lights have drawbacks. They are expensive, inefficient and heavy.

What is needed is a box which can diffuse and control light from multiple lights in such a way that the box and lights are stable, preferably avoid the need for expensive lighting instruments such as fresnel (focusable) lights, and provide soft, diffused light preferably from multiple instruments such as par cans ("pars"), to enable the use of front projected lighting as the key or primary lighting for a stage or set.

What is also needed is a device that can project soft key light in a controllable way deep into the set evenly from front to back and side to side while having a compact profile to allow for cameras underneath and viewers behind. The light would be parallel to and under the microphone booms thus eliminating boom shadows. The light would also come from a similar angle as the cameras eliminating or "burying" shadows behind the objects themselves.

Certain lights have been made for overhead lighting, i.e., above a set or other item needing light. However, these do not provide an efficient soft projected and consistent light. For example, one configuration known as the "chicken coop" has six 1000-watt bulbs shaped much like household bulbs. Light is unevenly pushed through the lamps themselves and bounced off the light shell, resulting in a very mixed source with limited projection. Even if a diffusion screen is used, the light is inconsistent and the bulbs cannot be individually controlled.

Sometimes, a long cylindrical fabric sheath with a roughly 30-inch diameter opening is placed around some open globes in a wheel type configuration known as the space light. The sides of the sheath can be blackened. The problem with this light as an overhead light is that it uses a lot of energy for very little output. Much of the light is absorbed in the black sheaths and not output from the opening at the bottom of the sheath. The source, being just globes, is not internally or externally focused to project well through the exit port as described.

Light diffusion elements have been constructed of cardboard or other consumables in a jury-rigged fashion for a long time. There also is a company known as Chimera which markets cone-shaped soft tent-like members for attachment in front of a lighting source, typically a single fresnel light. However, none of the extensive art combines a box with interchangeable diffusion frames and standard light mounting rods facilitating the use of multiple par cans, e.g., four or more, to create a deeply projected but soft light that is consistent from near to far. Moreover, none put all of these elements together with built-in lights in a way that enables use of inexpensive light-weight lights with high output to obtain a soft projected light.

What is needed is a high-output, projected soft light from a modular system using multiple lights. What is also needed is such a system that is provided in a lightweight, foldable structure which readily mounts to standard mounting equipment such as stands, scaffolding or other existing support structure. What is also needed is a way to obtain soft projected light from inexpensive, non-focusable lights. What is needed is one device that solves many needs.

SUMMARY OF THE INVENTION

In each embodiment, the invention provides a light box which is preferably lightweight, foldable, modular and provides for soft projected light regardless of the lighting elements used. The invention, thought not limited to the use of nonfocusable lights, makes the use of inexpensive par lamps practical. Such lamps have an internal parabolic reflector which creates an extremely parallel beam of light. This "punchy" light has been found to be ideal to project through diffusion mediums to soften the resultant light, but to retain much of the deep throw inherent in the lamp. It has also been found that when combining par lamps of various intensities (i.e., wide and medium beams at specific distances through diffusion frames), it is possible to create a light that is more consistent from upstage to downstage than a point source or more traditional lighting instruments. The foldable modular light diffusion box in all its forms uses this principle as its cornerstone and constructs devices useful for the motion picture and television industries as well as other uses. Although par lamps are existing technology and diffusing light through frames is not novel, both the concept and forms of the foldable modular light diffusion box create and contain light in a new way and of a quality, portability and consistency previously unavailable.

The invention further provides a substantially consistent light intensity in spite of the inverse square law. Light intensity from a point source drops off according to the inverse square law, i.e., intensity (i) at any distance (radius) (r) or from a point source of intensity (I) is given by the following equation: $i = I \times (1/r^2)$. However, in the invention, as noted above, consistency is maintained.

In one embodiment, the invention provides a modular light diffusion box which preferably is adapted to hold multiple lights. The box has a housing for channeling and controlling the light, the housing having two sides, a top and a bottom formed so as to be lightweight yet rigid or substantially rigid. The housing also has a channel or channels for supporting a diffusion frame or frames, or filters. In a preferred embodiment, the housing supports a bar, such as a standard 1½" or $1^{5/8"}$ pipe (e.g., Speed Rail™) or other cross-member on which multiple lights may be mounted. In another preferred embodiment, the box is foldable and portable. It is also preferable that the box have an angle at its front end for directing light towards a set or stage when the box is elevated with respect thereto.

According to a modified embodiment of the invention, there is provided a foldable, modular light diffusion box containing an element for mounting multiple lights, and preferably containing multiple lights mounted therein. More preferably, these lights are high intensity but inexpensive, lightweight, and nonfocusable lights such as pars or par cans.

In a second embodiment, the invention provides a modular light diffusion box which has multiple lights disposed therein. Preferably, the lights are inexpensive, nonfocusable lights such as pars. The box has a housing or shell having four sides connected together for folding flat. The housing has an open front and an open back. One of the sides has an access door for opening and closing to selectively insert and replace diffusion screens or filters. A C-shaped yoke rotatably connects to two sides of the shell on the outside. The yoke has a standard pin for mounting to a stand or other standard female receptor. A rectangular reinforcing skeleton or frame mounts inside the shell and the lights are fixed to a standard pipe or rod mounted inside the rectangular frame.

In a third embodiment, the box is similar to the previous embodiment and has four lights therein. The front of the box has an angular face. The box is mountable to a green bed, scaffolding or otherwise supportable in the air by hanging it, rather than having a yoke. The box is constructed such that it may be placed adjacent other boxes to provide for a larger projected light. In this embodiment, the rectangular frame has two triangular frame elements connected to it, and the triangular elements support a standard rod for mounting the lights.

In a fourth embodiment, the box is rectangular and is hinged at the center of its short sides to collapse together. The box is adapted to be hung from a ceiling or other structure directly above the area to be lit. In a fifth version of this box, the shell may be soft, e.g., made of fabric and attached to, so as to hang from, the rectangular frame. The diffusion or gel frames are also attached to the rectangular frame at their corners by a chain or other flexible or collapsible attachment. The lights connect to a Socopex™ connector or the equivalent. Yet another version of such a flexible, collapsible box has a rear cover which is perforated to provide for protection for the lights, which are built-in.

Still another version has built-in lights and a cover, a yoke mounted to the rectangle, and rigid members to hold the fabric instead of chain.

BRIEF DESCRIPTION OF THE DRAWINGS

FIG. 10 is a perspective view of a shell of the box of FIG. 9 without a rectangular frame and other parts of the box attached thereto, so that the shell is ready to fold;

FIG. 11 is a perspective view of the shell of FIG. 10 in a partially folded state;

FIG. 12 is a perspective view of the shell of FIG. 10 in a folded state;

FIG. 15 is a rear perspective view of a light box according to a third embodiment of the invention;

FIG. 34 is a perspective view of a hinge connection in a partially folded state in the diffusion frame of FIG. 29;

FIG. 34A is a perspective view of the hinge connection in a fully assembled state in the diffusion frame of FIG. 29 taken along a circle 34A;

FIG. 40 is a rear perspective view of a lighting box according to a fifth embodiment of the invention where the shell is soft;

FIG. 41 is a rear perspective view of a lighting box according to a sixth embodiment of the invention where the shell is soft and the box has a rear cover with lights held in collars with retaining rings rather than cans;

DETAILED DESCRIPTION OF THE PREFERRED EMBODIMENT(S)

Figure 2:
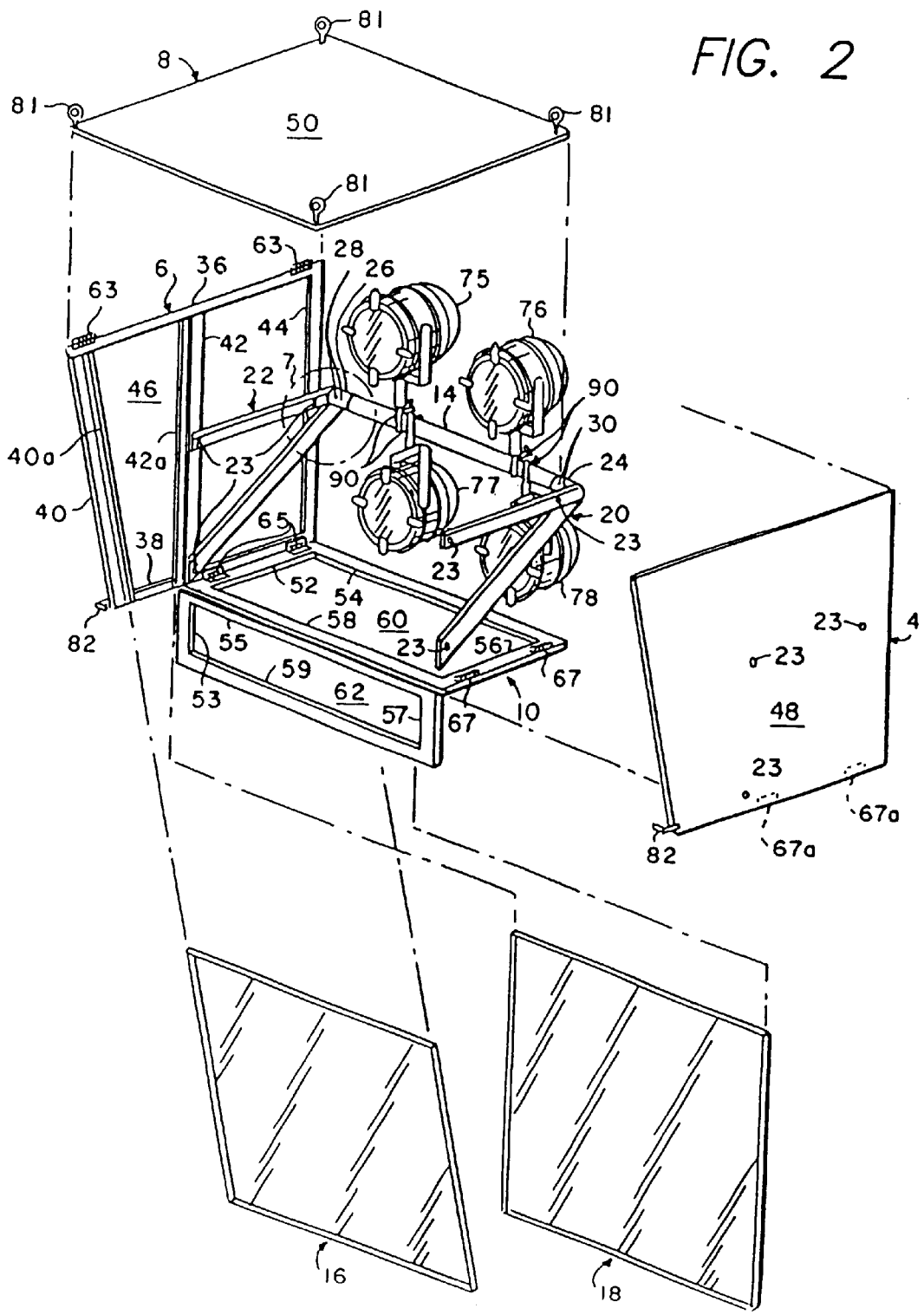
FIG. 2 is an exploded perspective view of a light box according to the invention.

In FIG. 2, a box 1 according to one embodiment of the invention is shown. It has a housing with four sides, namely a left side 4, a right side 6, a top 8 and a bottom 10, which are shown planar. The back is preferably open and the box preferably has a light mounting structure such as a cross-member, holder or bar 14. Bar 14 is preferably formed by speed rail, a standard rod well known in the motion picture and television industry for mounting lights such as pars. The bar 14 may be any kind of cross-member or other structure suitable to readily mount multiple lights. At the front of the housing there are two diffusion holding elements, filter holding elements, screens or frames 16, 18, which each hold diffusion elements or filters. In use only one diffusion screen or filter need be used. Part of the screen or screens may be made opaque for further control of the light emanating from the box. The phrase diffusion element will be used herein to mean diffusion frame, screen or other structure used to diffuse or soften light from the stage lights.

The bar 14 is mounted to the left and right sides of the housing by means of members or V-brackets 20, 22, having cups 24, 26, respectively, which each receive the ends of the bar. Set screws 28 and 30 are used to fix the ends of the bar in the cups.

In the disclosed embodiment, each side, top or bottom of the housing consists of a skeletal frame with frame members and a panel, preferably opaque, and the sides are hinged together. With continued reference to FIGS. 2, 3 and 4, side 6 has frame members 36, 38, 40, 42 and 44 and an opaque (right side) panel 46 to which the frame members are bolted, riveted, soldered or otherwise connected. The left side 4 is constructed using a mirror image of frame members to which a panel 48 (an opaque, left side panel) is fastened in like manner. On the right side panel 46, and in like mirror image on the left side panel 48, there are two channel members 40a, 42a for receiving the diffusion elements 16, 18. The diffusion elements are constructed preferably in a manner similar to screen windows. If only one diffusion element is used, it is preferable to use the forwardmost element 16. The top 8 also has a panel 50 and frame members around the edges, including frame members 47, 49, 51. The bottom 10 has two panels 60, 62, the larger panel having frame members 52, 54, 56 and 58 around its edges and the smaller panel 62 having frame members 53, 55, 57 and 59 around its edges. The smaller panel and its frame members form a door 10*a*.

The various frame members may be rectangular tubing, and the frame members, panels and other components are preferably of a lightweight but strong material such as aluminum, and the channel members may be C-shaped and preferably constructed of a lightweight rigid material such as aluminum as well. The sides, top and bottom may be formed of any rigid or semi-rigid material sufficient to support the cross-member 14 and a mechanism for mounting the cross-member 14.

Figure 3:
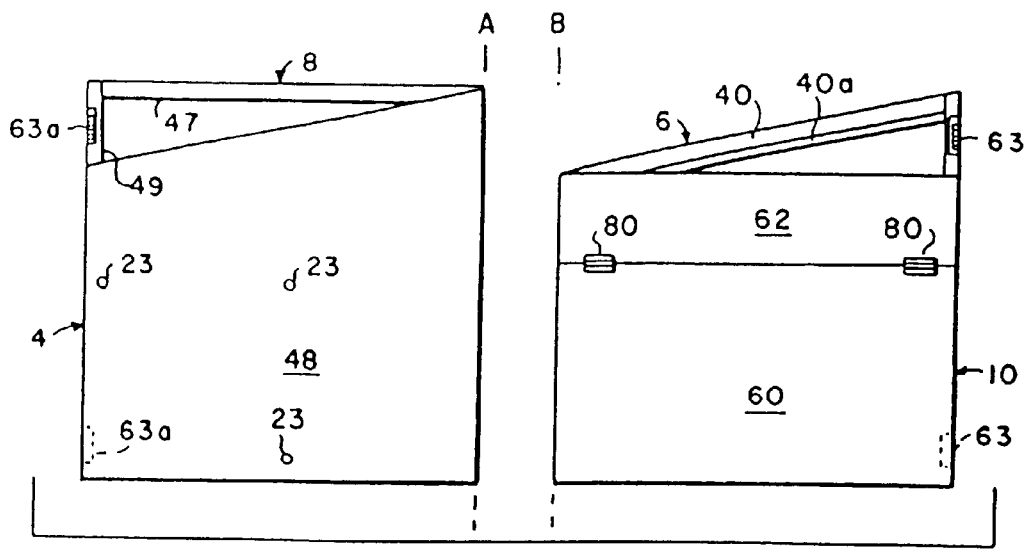
FIG. 3 is a side view (rotated 90° clockwise with respect to FIG. 2) showing a top and left-side subassembly and a bottom and right-side subassembly of the box of FIG. 2 in a folded position in accordance with an aspect of the invention.

So that the box is easy to transport and store, the sides, top and bottom are preferably formed so as to be foldable in two units, as shown in FIG. 3. The left side of FIG. 3 shows left side 4 and top 8 which are preferably permanently hinged together for rotation and folding about axis A. The right side of FIG. 3 shows bottom 10 and right side 6 which are permanently hinged together for folding about axis B. The permanent hinged connections are shown by hinges 65 in FIG. 2 which connect the bottom frame member 52 to the right side frame member 38, and like hinges (not shown) connect a frame member of the left side 4 and top 8. The two subassemblies, i.e., the top 8 and right side 6 and the bottom 10 and left side 4, connect together by means of two sets of knockout hinges. These include half hinge members 63 mounted to frame member 36 of the right side 6 which mate with half hinge members 63*a* (FIG. 3), which then receive a knockout (hinge) pin. Similar half hinges 67 and 67*a* are mounted on the bottom frame member 56 and a frame member (not shown) of left side 4. With this structure, the two subassemblies may be readily connected and disconnected by inserting or removing hinge pins.

Figure 4:
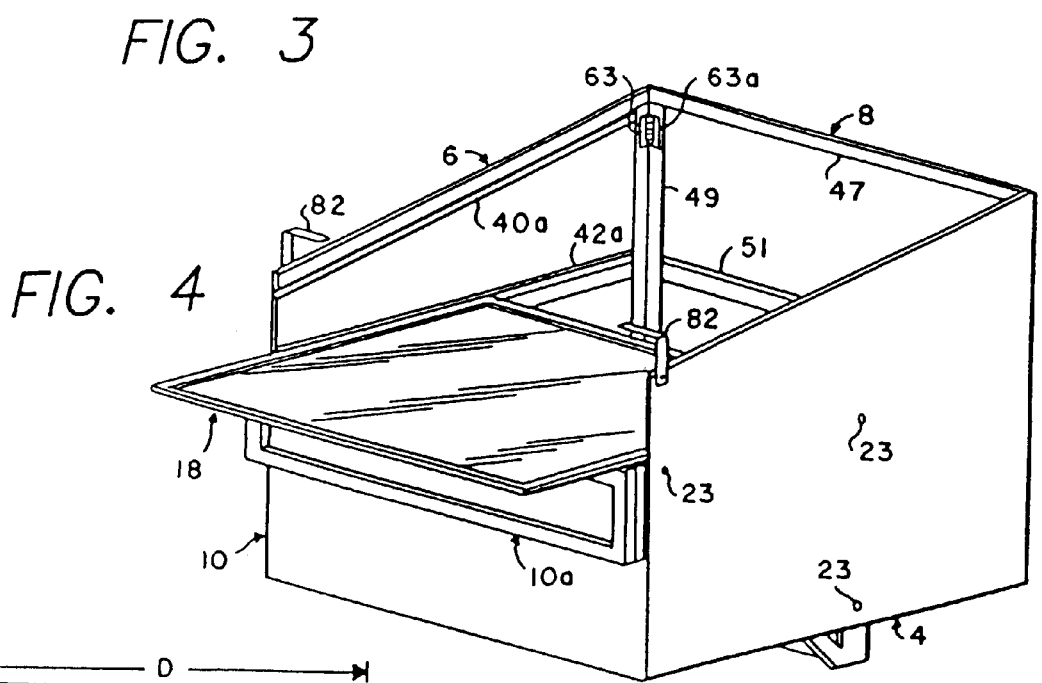
FIG. 4 is a perspective view (rotated 90° clockwise with respect to FIG. 2) showing a bottom of the box of FIG. 2 with a bottom door open and a diffusion screen being slid into the box in accordance with another aspect of the invention.

The door 10*a* of the bottom enables the diffusion elements 16, 18 to be readily removed and replaced when the box is assembled, even when it is in place for lighting a set or stage. Hinges 80 (FIG. 3) on the external side of bottom 10 connect panel 60 and panel 62, which is smaller than panel 60, and thus enable the door to rotate open and closed. As best shown in FIG. 4, two angle members 82 bolted at one end to the sides 4, 6, are rotatable between the positions shown in FIG. 1 to hold the door closed and the position shown in FIG. 4 to open the door.

In one embodiment of the invention, the housing and diffusion element(s) may be used without the V-brackets and bar, and may be mounted to scaffolding or otherwise positioned in front of multiple stage-type lights. In the preferred embodiment, multiple stage-type lights 75, 76, 77 and 78 may be readily clamped onto the bar 14 supported by the housing. Where the bar is a rod such as speed rail™ or the like, typical stage lights have C-clamps 90 readily connectable to such rod or speed rail™. Therefore, regardless of the stage-type light that is used, it may be quickly mounted and unmounted from the bar 14. Accordingly, no special mounting structure is necessary, although any suitable mounting structure will do.

Figure 7:
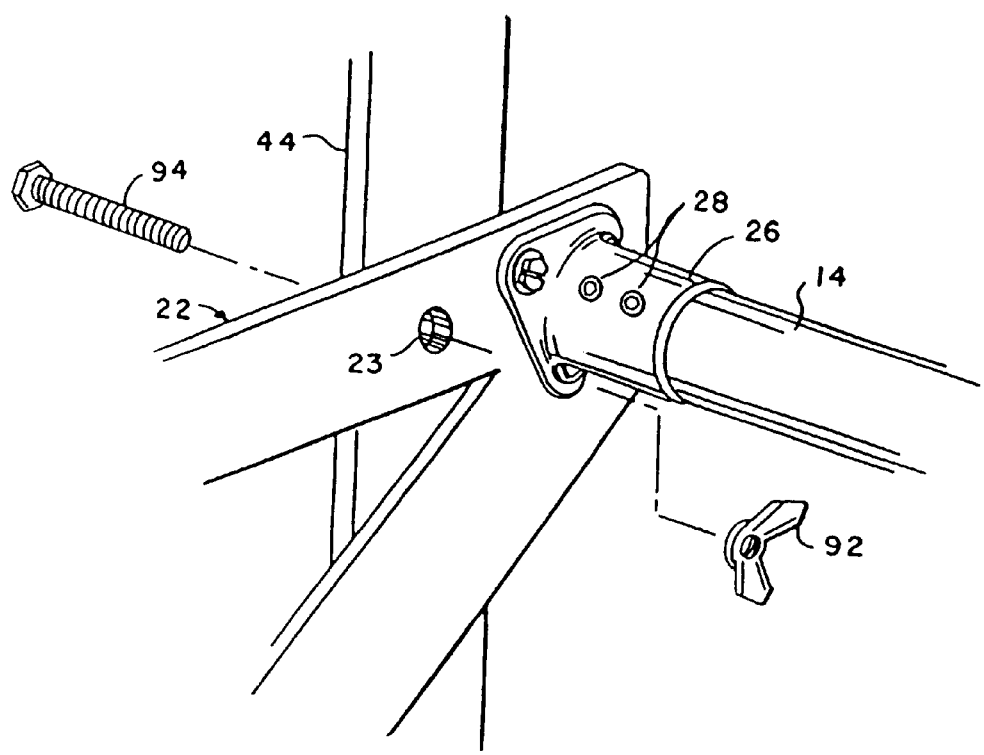
FIG. 7 is an enlarged view of a portion of FIG. 2 inside circle 7.

In operation, the box may be assembled as follows:

The two sub-assemblies of FIG. 3 may be rotated to be open at 90°. The hinge halves 63, 63*a* and 67, 67*a* are then positioned to mate, and the hinge pins are inserted. The housing may then be rotated onto its bottom panel and the V-brackets 20, 22 may be bolted to the frame members of the left and right side using wing nuts 92 and bolts 94 (shown in detail in FIG. 7), after inserting the speed rail in the cups 24, 26 and tightening the set screws 28, 30.

Alternatively, the V-brackets may be affixed to the side members before the side members, top and bottom subassemblies are connected. One side of the speed rail would then be inserted into one cup and the set screws tightened, and the other side would then be inserted into the remaining cup upon connecting the side, top, bottom and other side.

Figure 1:
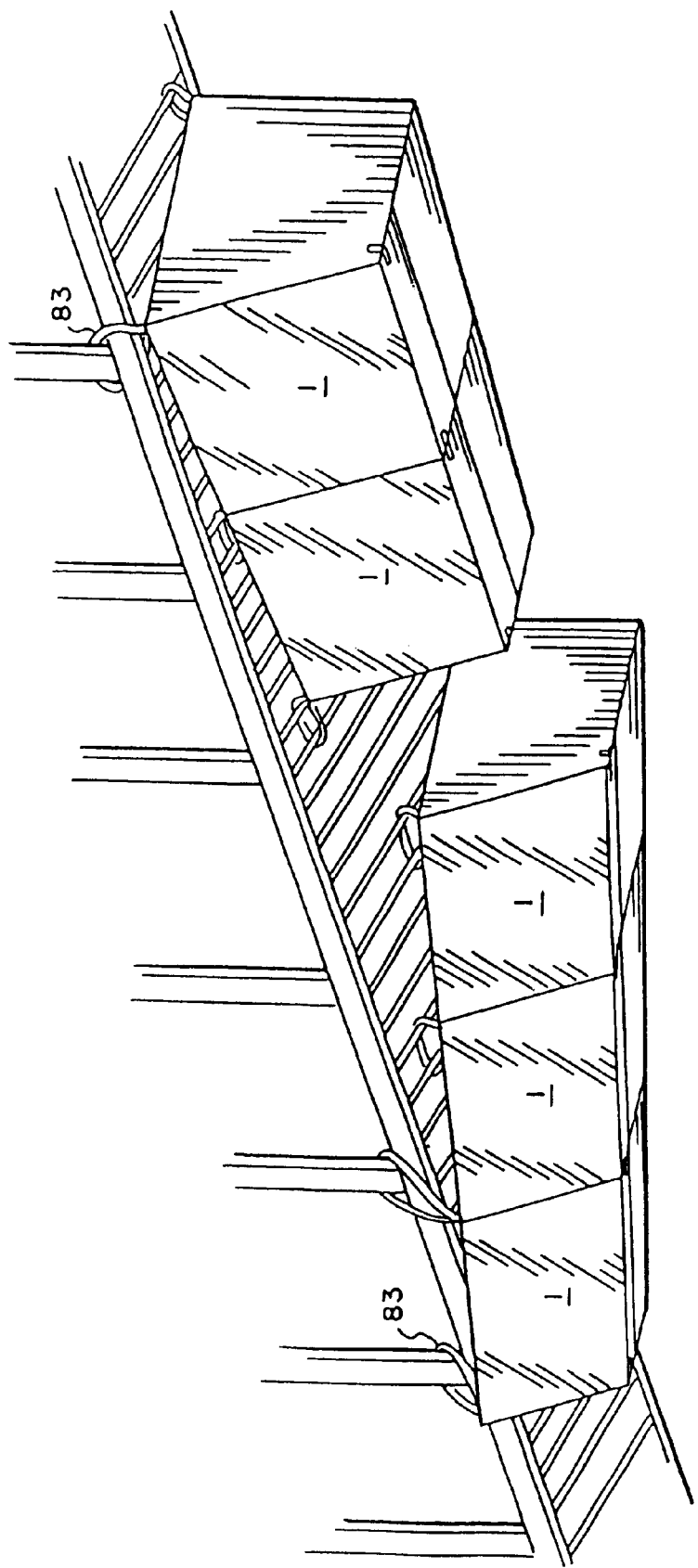
FIG. 1 is a schematic perspective view of five (5) light boxes for front projection illumination of a set in accordance with the invention.

Once the housing, V-brackets and bar are connected, the stage lights are mounted using the C-clamps and the diffusion elements are slid into place. The door 10*a* is rotated closed and the angle brackets 82 are rotated downward (in FIG. 2) to hold the door closed (as shown in FIG. 1). The box may be disassembled in reverse order.

Preferably, the back of the box is open which allows for venting of the lights, as well as easily mounting them, disconnecting them, electrical line access, and positioning of the lights.

In accordance with another aspect of the invention, several boxes may be used adjacent one another or otherwise positioned to cooperate to light a set. These boxes may be suspended, such as from scaffolding, as shown in FIG. 1. In the television and movie industry, existing scaffolding in indoor stages is known as a green bed. A simple means to suspend the box or boxes from the green bed is to provide eye bolts 81 fixed to the frame members of the top 8 and use chain or rope 83 connected to the eye bolts and the scaffolding as shown in FIG. 1. As also shown in FIG. 1, three boxes 1 are adjacent one another on the viewer's left side of FIG. 1 and two boxes 1 are adjacent one another on the right side of FIG. 1. The three boxes together would typically provide greater light, given use of the same lights in each box, and thus be known as key lighting for a set or stage and the two box group would provide fill light.

Figure 5:
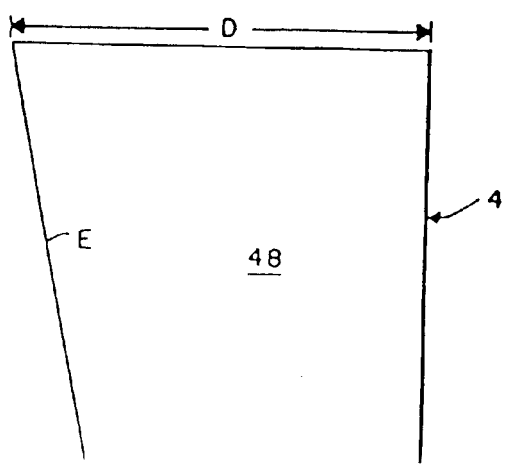
FIG. 5 is a side view of the box according to the invention showing an angle at which the front edges of the left and right side panels are cut in accordance with a further aspect of the invention.

With reference to FIG. 5, the angular front edges of the left and right side members will be explained. The angle provides a way to channel and direct light when the boxes are horizontally mounted, such as shown in FIG. 1, with the top flush or parallel to the green bed or the like. The angle also allows light to project to the upstage portion of the set and the downstage portion, even though the boxes are mounted in the air and close to the set. The angle may be selected depending upon the geometry of where the boxes are mounted in relation to the set, as well as any other factors well known in the art. For example, the top may have a depth dimension D of four feet and the bottom may have a depth dimension C of three feet, thus providing front edge E with an angle "tilted downward." Preferably, the distance from the top of the box to the bottom would also be four feet. The angular orientation of diffusion element 16 also provides a greater surface area with which to diffuse the light.

The boxes can be constructed larger, or smaller, with any appropriately desired dimension, but it is advantageous to construct them with a four-foot square length and width cross-section. This size readily accommodates four lights, the two lights on top and the two lights on the bottom. Alternatively, the box could be eight feet wide by four feet tall which would accommodate eight lights for standard pars. More lights can be fit into a box than is shown in the drawings, to increase the strength depending on the use. In addition, one may put lights at three or more relative heights or put more than two across.

By use of higher powered lights on top, upstage lighting can be comparable to downstage lighting, and by use of boxes placed side to side, lighting at one side of the set can be comparable to lighting at the other side.

Figure 6:
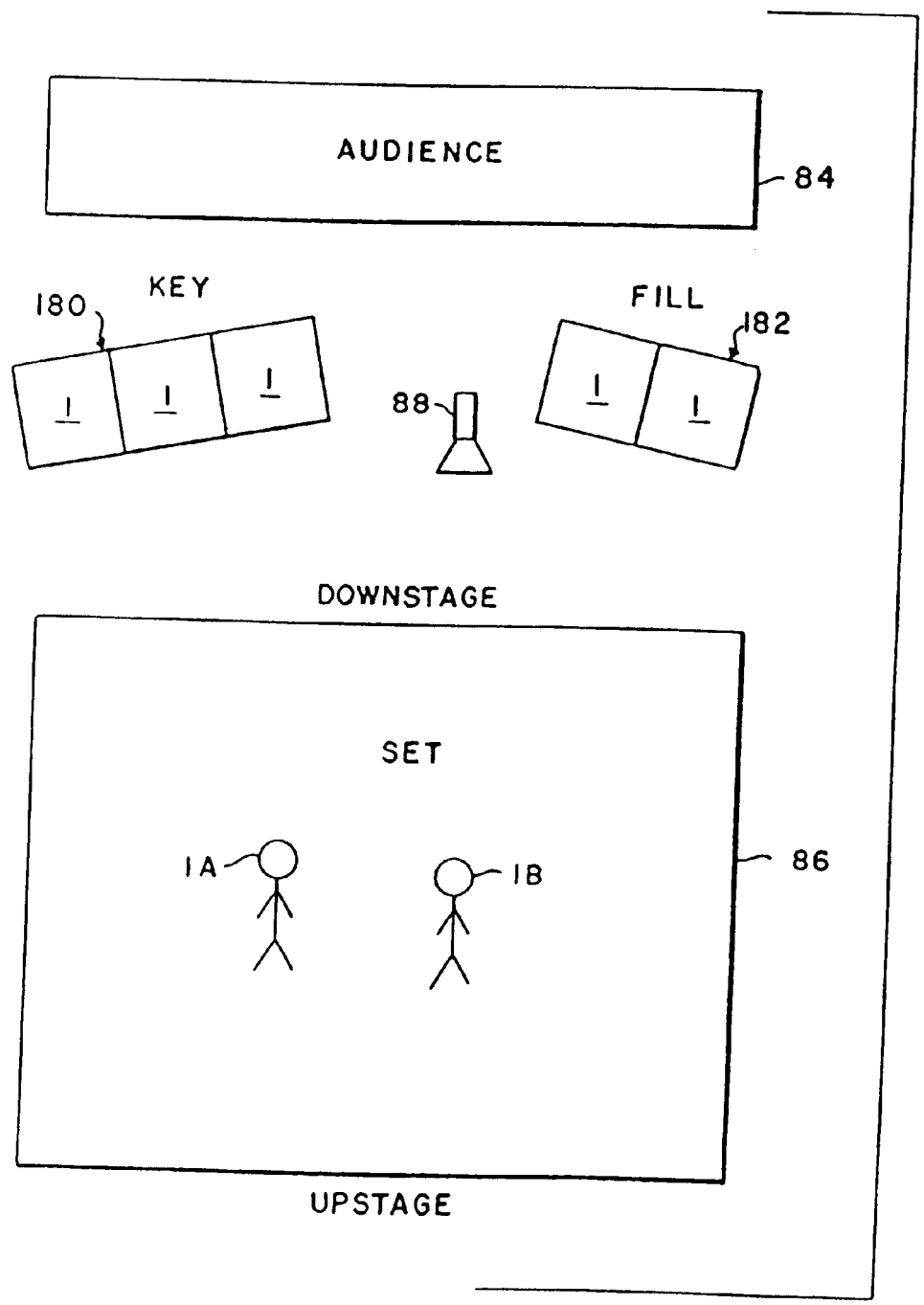
FIG. 6 is a schematic diagram of a set with front projected lighting provided from a plurality of boxes in accordance with the invention.

The diagram of FIG. 6 shows how boxes according to the invention are used to provide for front-projected light to a set. In a sitcom-type set, it has been conventional to light the actors 1A and 1B from the back typically by expensive, high-powered fresnel lights. The back (upstage) of the set 86 is defined with respect to the location of the camera 88 which is at the front (downstage). When a sitcom or the like is filmed, typically there is also an audience 84 located downstage. The key lights 180 and fill lights 182, when constructed in accordance with the invention, may be provided at the front of the set. Undesirable shadows from objects, actors and boom sound equipment, which normally extends from the front from above the green bed, are avoided because of the diffused light emanating from the boxes rather than multiple high-powered beams from multiple lights located below and parallel to the booms. Moreover, the boxes take a diffusion element and apply it to multiple lights in a way that is quickly and easily controlled to light the entire set evenly. When the lights on top of the bar are higher powered than the lights below the bar, the upper lights illuminate the back of the set as well as the lower lights illuminate the front. The system thus may use inexpensive stage lights, e.g., pars, rather than expensive lights, e.g., fresnels, provide a higher level of light with significantly fewer lighting instruments, and achieve greater depth of field. For example, in a three box key light, one may use six 1000-watt pars (medium) for the upper lights and six 1000-watt pars (wide) for the lower lights and achieve a 4.6 @250 ASA on the downstage portion of the set and a 4.3 upstage, allowing for use of slower film or a deeper depth of field, or a combination thereof.

Figure 8:
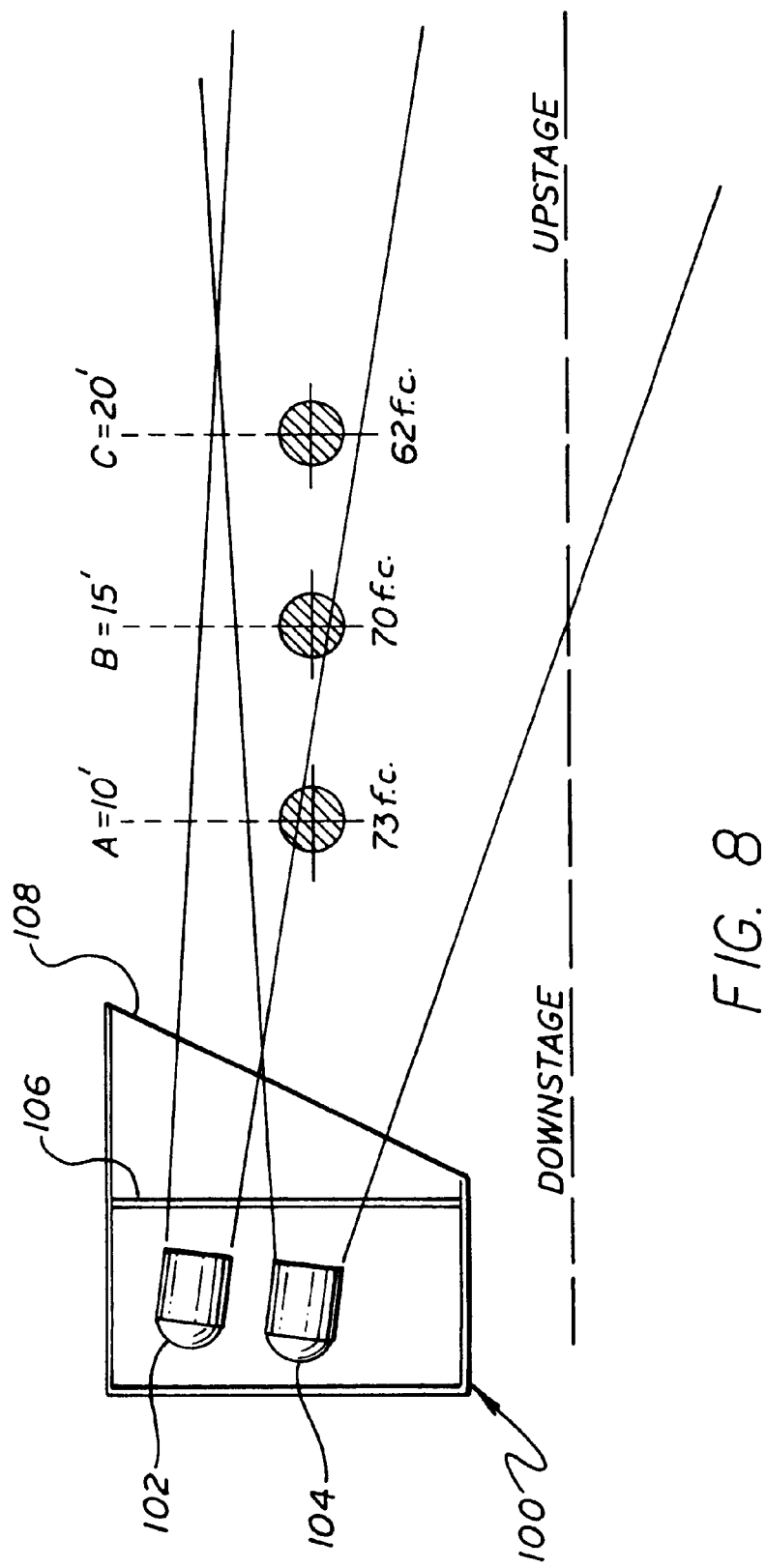
FIG. 8 is a schematic diagram showing par lights for illustrating and explaining a lighting theory of the invention.
Figure 43:
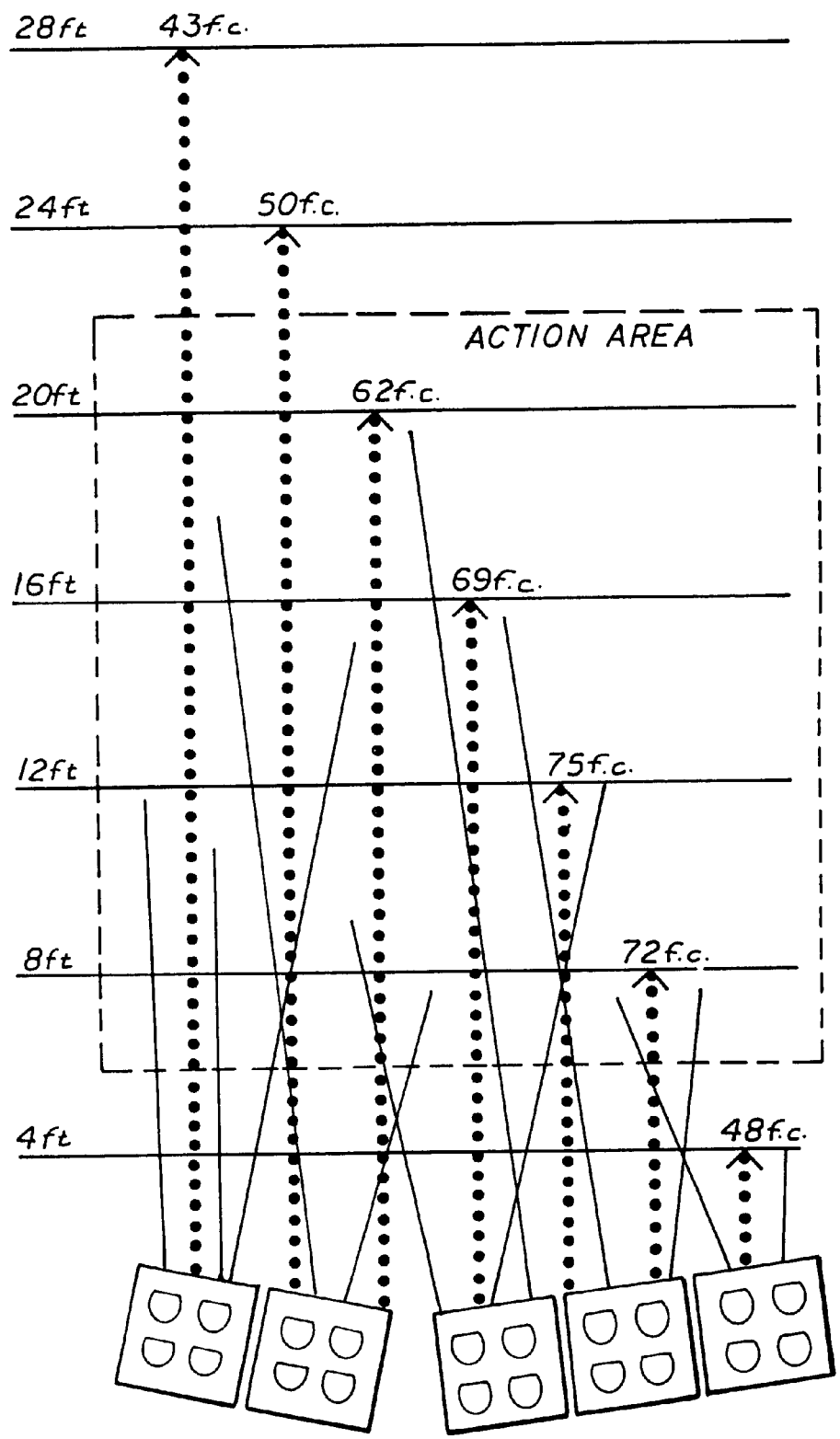
FIG. 43 is a schematic diagram for purposes of explaining additional lighting theories according to the invention.

A lighting theory according to the invention and its beneficial results is explained and illustrated with reference to FIGS. 8 and 43. A series of five lighting boxes 100 are each equipped with two medium 1000-watt par lights 102 and two wide 1000-watt par lights 104 below them. As shown in FIG. 43, diffusion screens 106 and 108 were used, and light intensity was measured at eye level at locations A, B and C, ten feet, fifteen feet, and twenty feet, respectively, from the par lights 102, 104. The measured intensities were 73 fc, 70 fc, and 62 fc, respectively. More specifically, as shown in FIG. 43, there are three adjacent boxes used as key light and two adjacent boxes used as fill. Both FIGS. 8 and 43 show footcandle readings at eye level where the boxes are hung at about nine feet. The center diffusion screen contained LEE 187 cosmetic rouge gel. The outer gel frame used light grid cloth. The device "defies" the inverse square law of light. Light fall off is less than ½ stop at all points and action areas show less than ¼ stop fall off. The lights on top provide much of the intensity for the far field (upstage). The lights on the bottom provide much of the light in the near field (downstage). The middle area is lit by a mixture of both the upper and lower lights, thus creating the previously unavailable and significantly advantageous ability to evenly light a given action area with one device.

Figure 9:
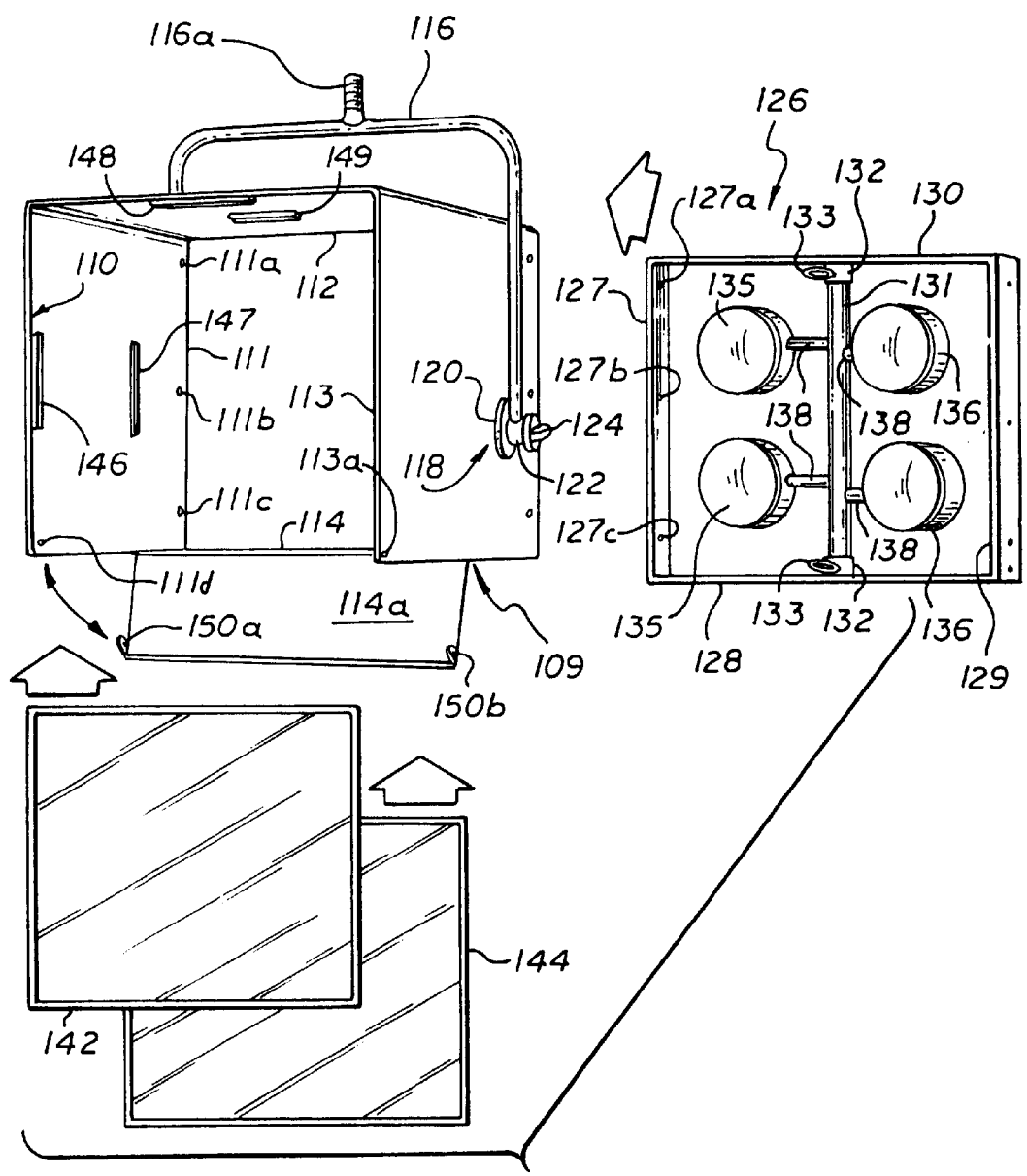
FIG. 9 is a partly exploded and front perspective view of a lighting box according to a second embodiment of the invention.

A lighting box 109 according to a second embodiment of the invention is shown in FIG. 9. It has a shell 110 with four sides 111, 112, 113, 114. A yoke 116 mounts by two rotatable friction knob assemblies 118 to the shell at the outside of sides 111, 113. Each assembly 118 has a mounting plate 120 bolted or otherwise fixed to the shell 110, a rotatable connector 122 rotatably connected to the plate 120 and having a hole for receiving an end of the yoke 116. There is a friction knob 124 for fixing the yoke at a desired angle and for loosening the connector 122 to rotate and thereby rotate the yoke to another desired angle. Accordingly, the top side 112 of the shell need not extend out past the bottom side 114.

A rectangular or square frame 126 has four sides 127–130. The frame supports a mounting bar 131 which may be a rectangular bar, or circular rod, fitted at each end into a rectangular (or circular) cup 132 fixed to sides 128, 130. The bar 131 may be held in the cups 132 by pins or bolts 133. Multiple lighting elements, units or instruments 135, 136 are fixed by mounting elements 138, such as pipe clamps or a fixed connector to the bar 131 (or rod). The two lights on top, e.g., non-focusable lights such as pars, are preferably of higher intensity than the two lights below, e.g., non-focusable lights such as pars 135, 136. The pars on top may be medium and the pars below may be wide. The rectangular frame 126 ("rectangle") my be put in the shell as shown, or rotated 90° so that the bar 131 is horizontal.

The rectangle screws or bolts to the shell. For example, each side has three holes. Side 127 has holes 127a, 127b, 127c and each side of the shell, e.g., side 111, has three matching holes, e.g., holes 111a, 111b, 111c, for pinning, screwing or bolting the frame inside the shell. Diffusion frames 142, 144 may be slid into pairs of C-channel slots 146, 147 on opposite sides of the shell and upper slots 148, 149. The gel frames are held in the box preferably by a mechanism other than the access door being closed. Otherwise, when the door is opened, the frames will fall out. The mechanism is a cotter pin and holes through the shell and in the gel frame, e.g., as shown and described later with respect to FIG. 22.

As in the prior embodiment, an access door 114a is hinged to the rest of the side 114 to be openable and closable to enable the diffusion frames, color filters or the like to be readily inserted or replaced. At its front corners, there are two releasable fasteners 150a, 150b, e.g., quarter turn fasteners (such as DZUS™ fasteners) which engage receptors or holes 111d, 113a to hold the door 114a in the closed position by being turned 90° with a screwdriver or the like. They readily turn 90° in the other direction to release the door.

Figure 13:
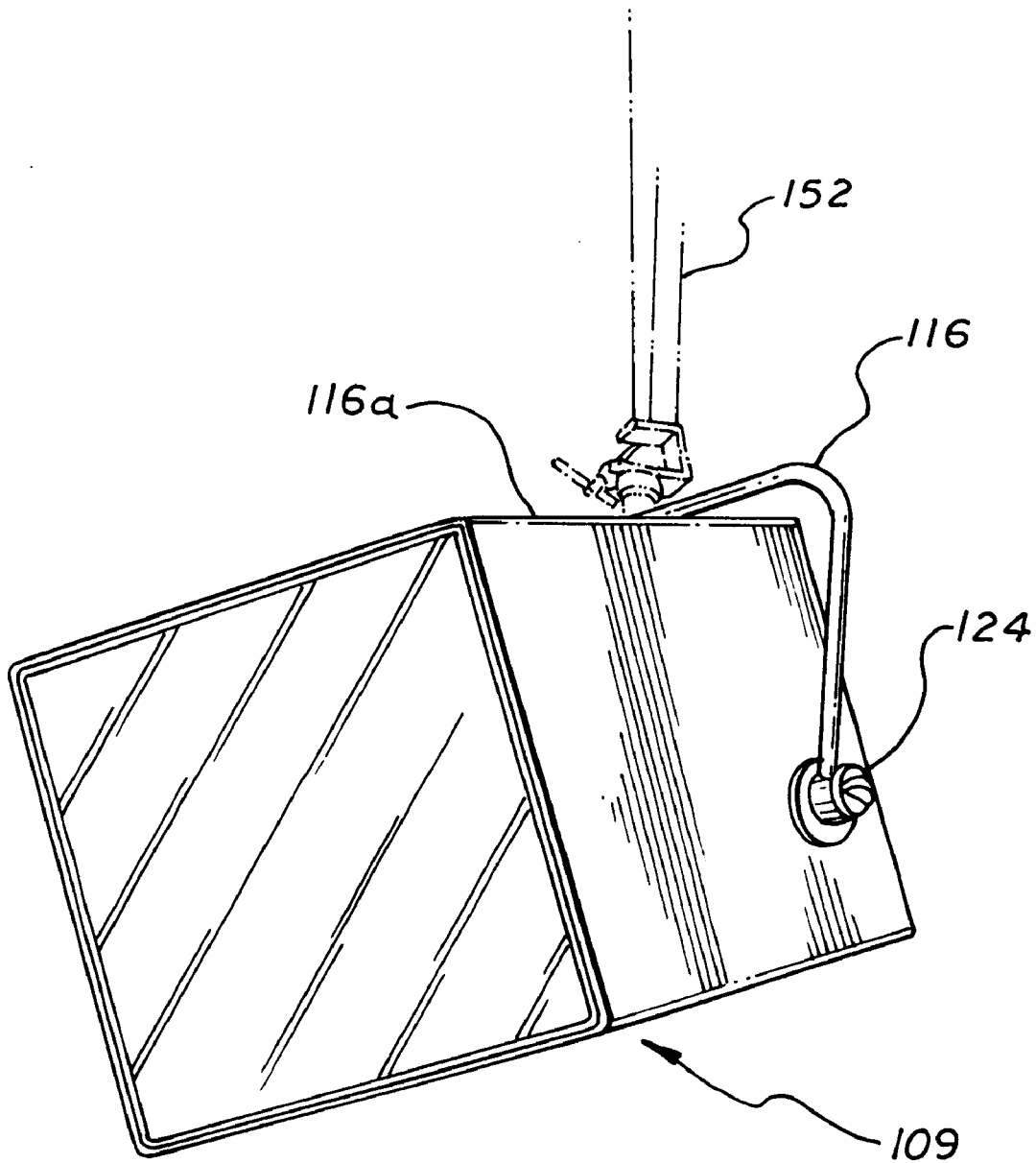
FIG. 13 is a perspective view of the box of FIG. 9 mounted to an overhead mounting arm and tilted at an angle facing partly downward.
Figure 14:
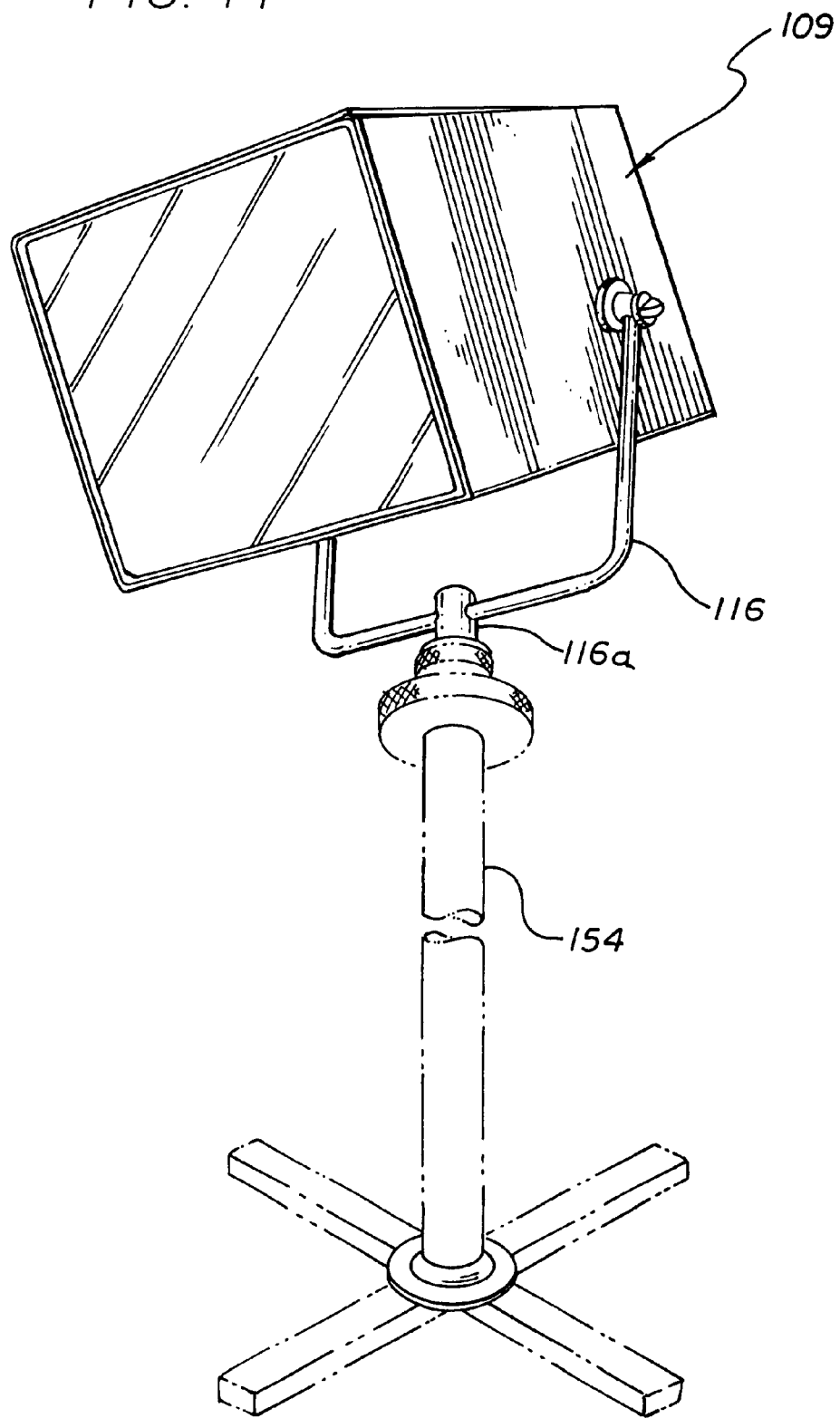
FIG. 14 is a perspective view of the box of FIG. 9 mounted to a stand and tilted at an angle facing partly downward.

Yoke 116 has a threaded pin 116a for mating with a standard female receptor in an overhead mounting arm 152 (FIG. 13) or into a stand 154 (FIG. 14). This box need not have a tilted front face because the whole box can readily have its angle adjusted by adjusting the angle of yoke 116 using the friction knob 124.

In this embodiment, the rod 131 is shown vertically oriented, but it may also be horizontally oriented as in other embodiments.

As shown in FIG. 10, side 114 is not connected to side 113. The shell obtains its structure from connecting the rectangle 126 inside the rear of the shell. Without the rectangle, the shell 110 readily folds up as shown in FIGS. 11 and 12. Specifically, with reference to FIG. 11, sides 112 and 113 are connected by a piano hinge 160 and fold together. Sides 111 and 112 are connected by a piano hinge 162 and fold back on each other, so that the entire shell folds up into the length and width of one side, as shown in FIG. 12.

Figure 17:
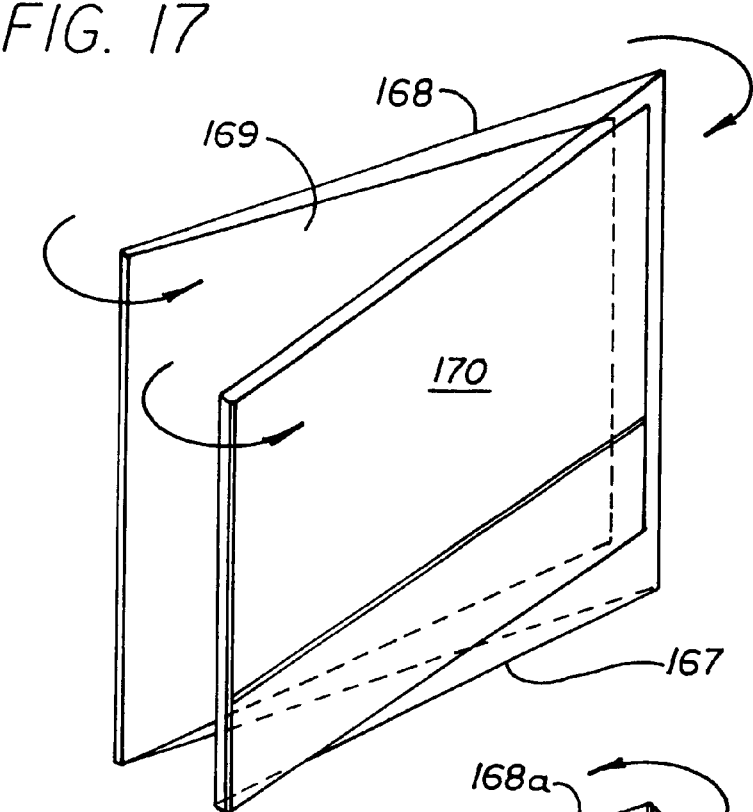
FIG. 17 is a view of the skin in a mostly folded state.
Figure 16:
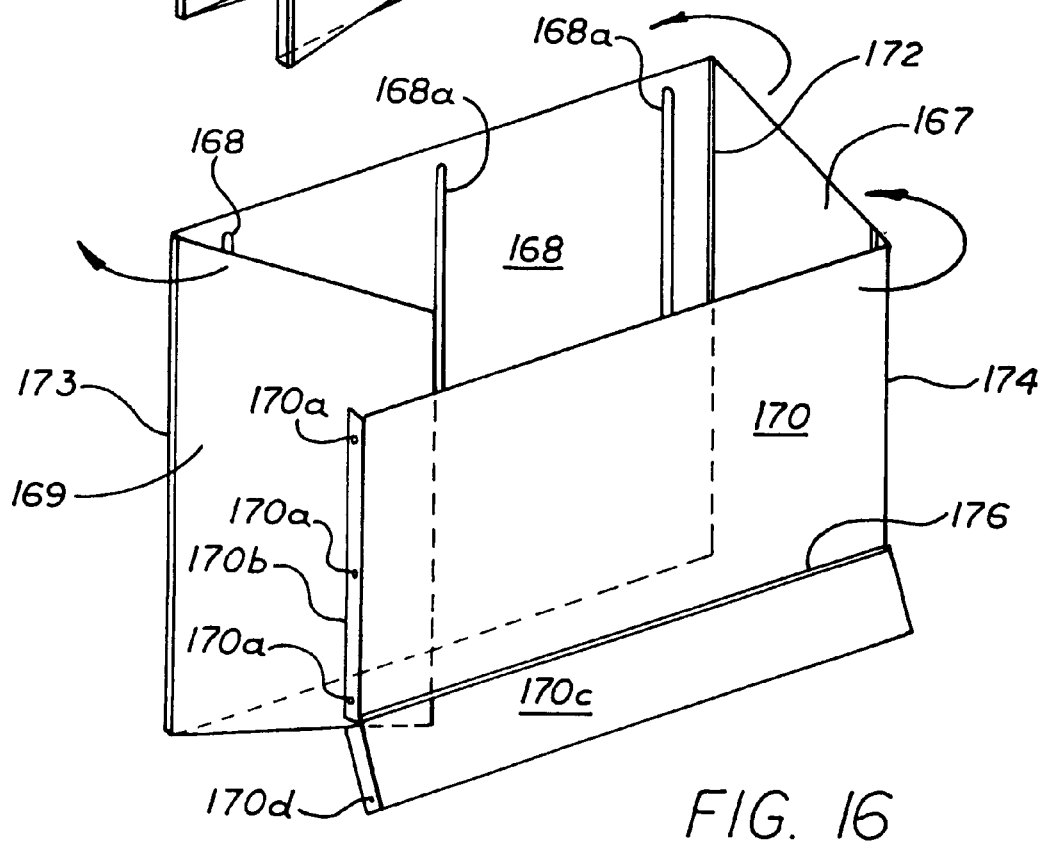
FIG. 16 is a view of the shell of the box of FIG. 15 without any other structure.

A modification of the box of FIGS. 9–14 is shown in FIGS. 15–22. Box 166 has a shell having four sides 167, 168, 169, 170. Sides 167 and 168 are connected by a piano hinge 172, sides 168 and 169 are connected by a piano hinge 173, and sides 167 and 170 are connected by a piano hinge 174. Side 170 folds counterclockwise in FIG. 16 onto side 167, and side 169 folds counterclockwise against side 168. Sides 168, 169 and 167, 170 fold together so that sides 169 and 167 are adjacent as shown in FIGS. 16 and 17. Sides 169 and 170 are not hinged, and may be fixed together by screws, bolts or pins to holes 170a formed in a flange 170b of side 170. Side 170 also has an access door 170c having a quarter turn fastener schematically shown as element 170e in a flange 170d. The access door 170c has a symmetrical structure on its opposite end. Access door 170c also has a piano hinge 176 for being rotatably connected to the rest of side 170.

Figure 18:
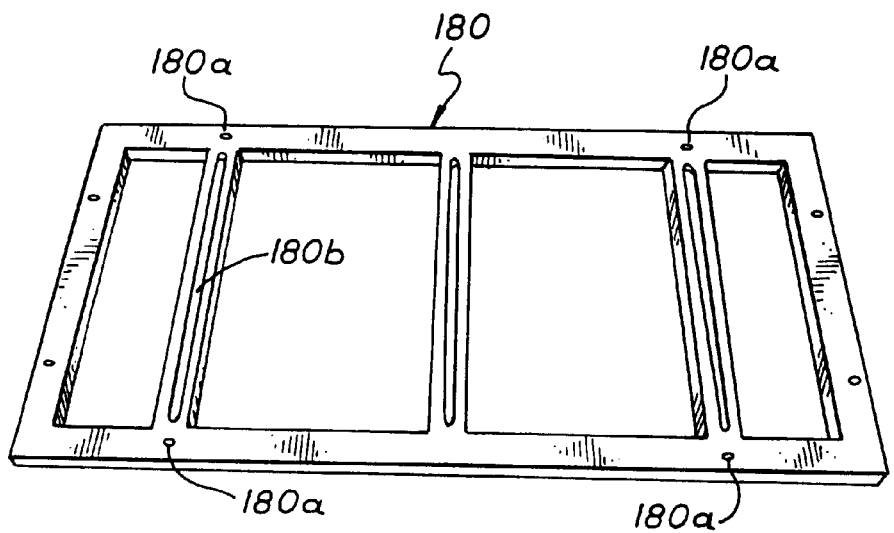
FIG. 18 is a perspective view of a rectangular frame element in the box of FIG. 15.
Figure 19:
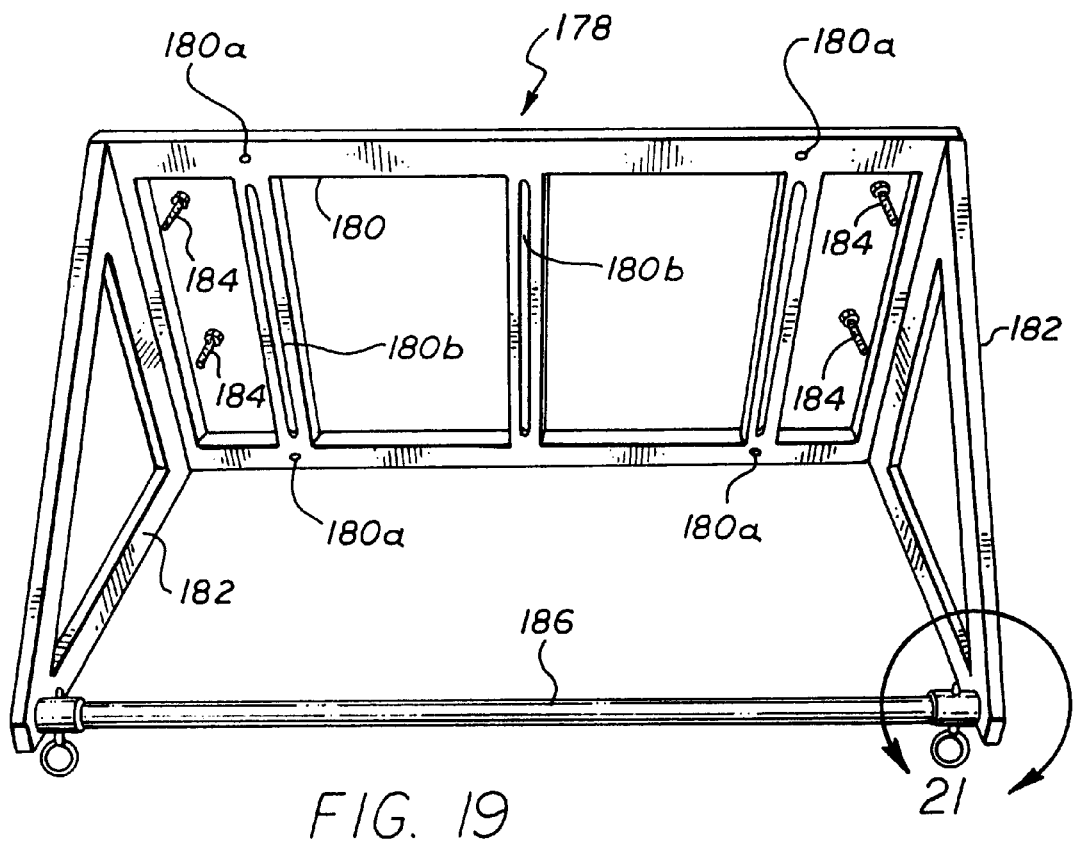
FIG. 19 is a perspective view of a frame assembly including the rectangular frame element connected to two triangular frame elements, which in turn hold a bar or rod for mounting lights in the box of FIG. 15.
Figure 20:
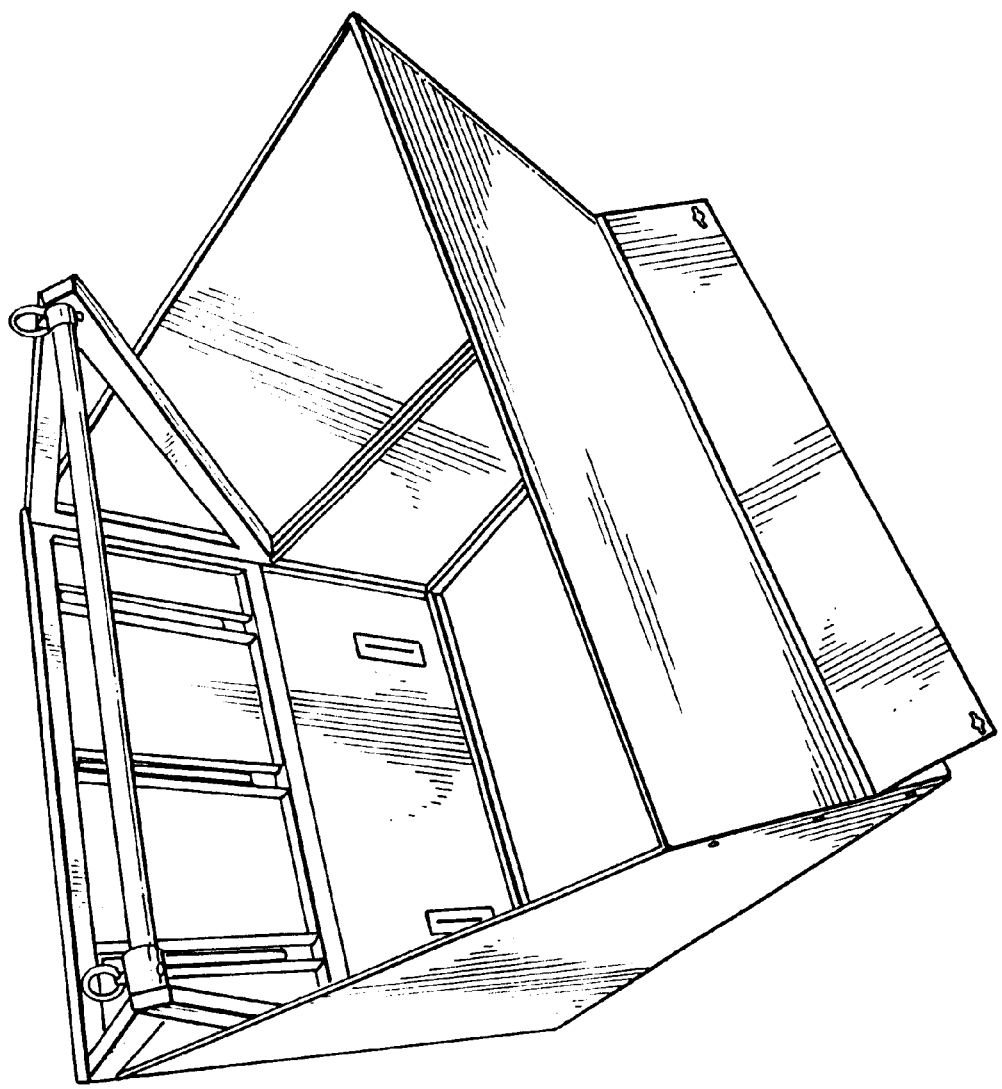
FIG. 20 is a rear perspective view of the box of FIG. 15 showing only the shell and the frame assembly.
Figure 21:
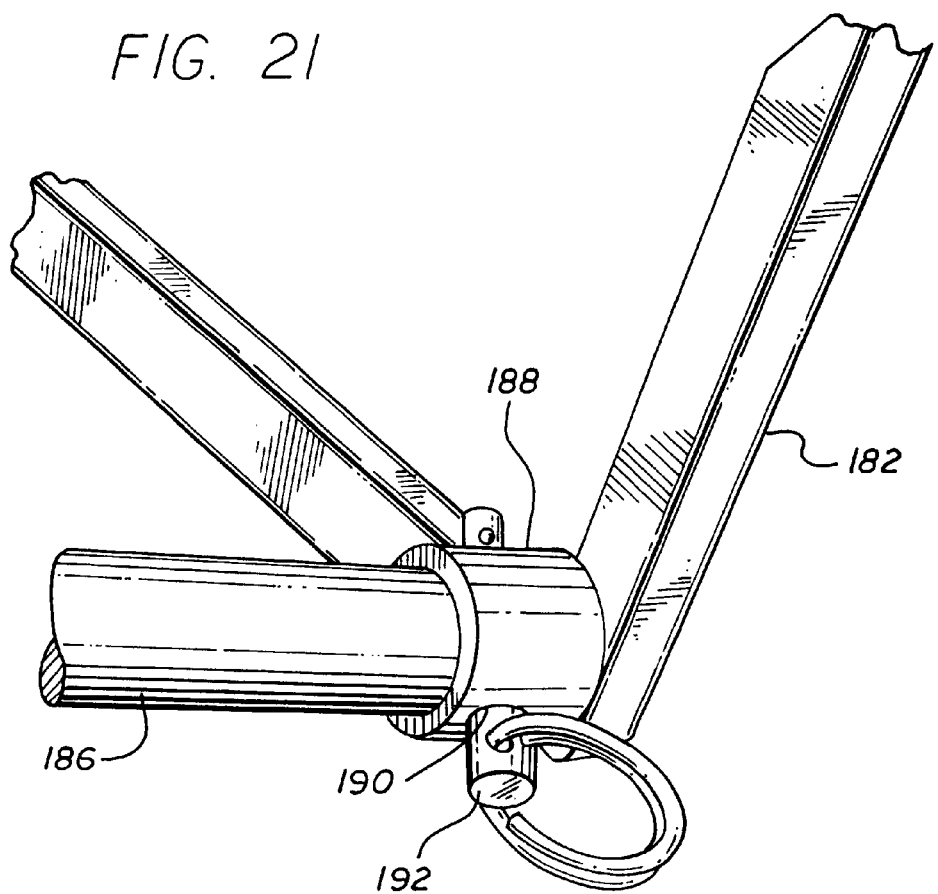
FIG. 21 is an enlarged view of part of the frame assembly taken along the circular line 21 of FIG. 19 showing how the bar and triangular frame elements connect.

With reference to FIGS. 15 and 18–19, frame assembly 178 for attachment to the housing and for supporting lights includes a rectangular frame member 180, two triangular frame members 182 screwed or bolted to the rectangular frame members by bolts 184, and a light mounting rail 186 such as schedule 40, an industry standard pipe about 1½" or 1⅝" in diameter. At each end of the rail 186, there is a cup 188 fixed, e.g., by welding, screws or bolts, to a corner of each triangular member 182. Each end of the pipe slides into each cup, and has a hole. When this hole registers with a hole 190 in the cup, a cotter pin 192 may be inserted therethrough to hold the rail 186 in place.

The frame assembly 178 attaches to the shell at side 168 by bolting, screwing or pinning through holes 180a in the rectangle and corresponding holes in side 168 (the top). Frame member 180 also has slots 180b which mate with slots 168a in side 168 so that eye bolts, pipe hangers or the like may be used to hang the box from or mount the box to scaffolding 196, a "green bed" or the like (FIG. 23).

Figure 23:
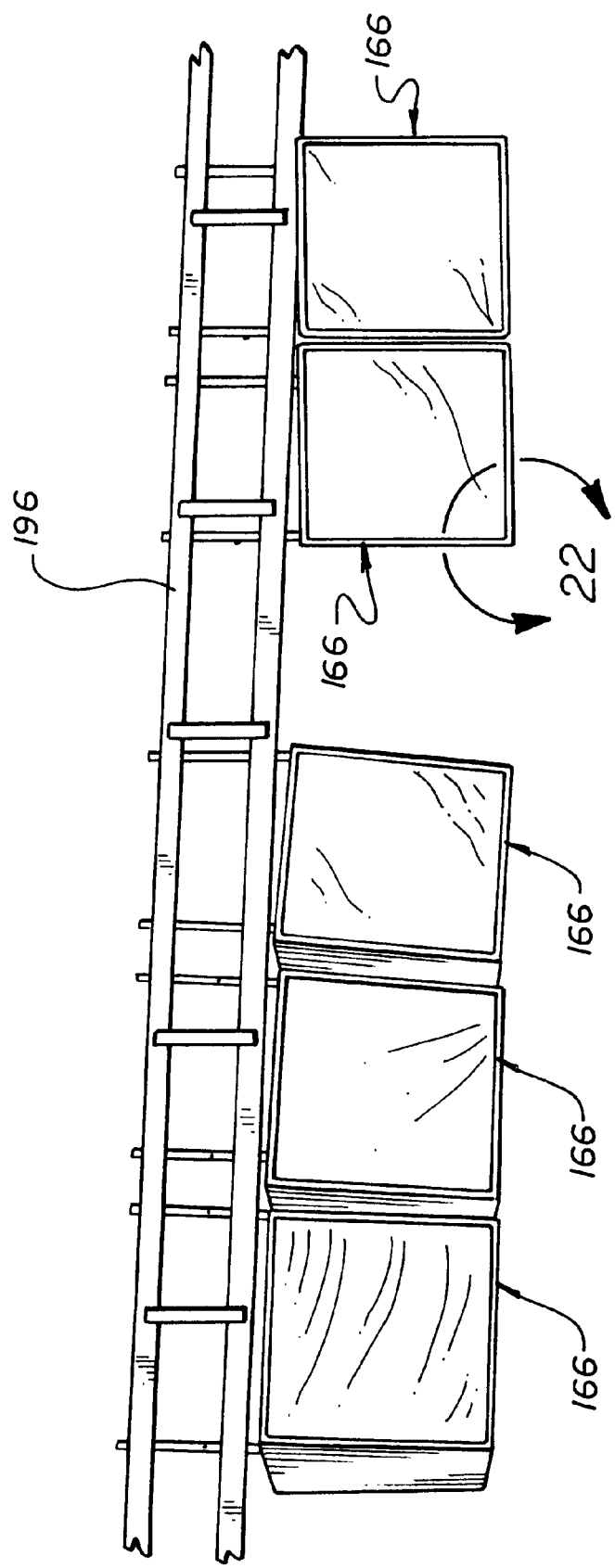
FIG. 23 is a front perspective view of multiple boxes of FIG. 15 mounted to scaffolding or a green bed similar to FIG. 1.

In FIG. 23, three boxes 166 are shown adjacent one another and two other boxes 166 are also adjacent each other to provide the effect of one larger box. The projected light that comes from such groups of three boxes and two boxes, each having four lights, is the same as or very similar to the projected light from one box having twelve lights and another box having eight lights, respectively, to provide as wide a light as desired. The modular structure of the box is evident from FIG. 23.

Figure 22:
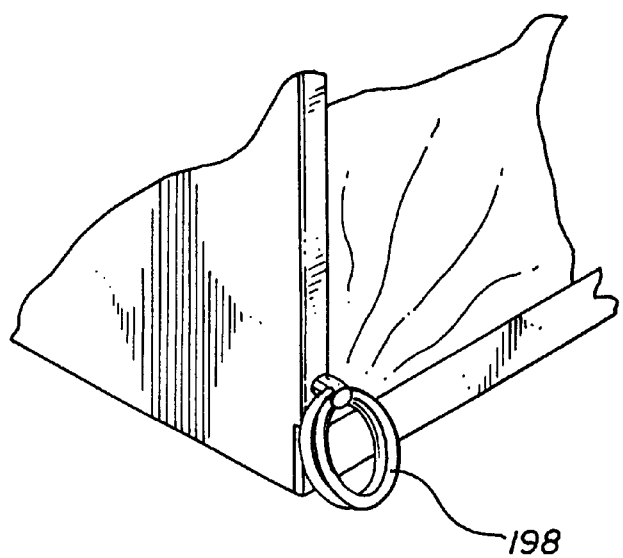
FIG. 22 is an enlarged view of a corner of the box taken along the circular line 22 of FIG. 23.

The diffusion frames may readily be removed and replaced by opening access door 170c in each box by turning the quarter turn fastener to open the access door, then removing a cotter pin 198 holding the gel frame as shown in FIG. 22. The pin 198 extends through the shell (a hole in side 169) then through a corresponding hole in the gel frame, and the same applies to side 167, as shown in FIG. 16. The diffusion gel frames are thus held in C-channels 199, 200 inside each side 167, 169 (FIG. 15) and two cotter pins hold each of the frames in place.

Four lights may be mounted to rail 186 as in previous embodiments. The two lights on top may be stronger than the two lights on the bottom, also as in previous embodiments.

Figure 24:
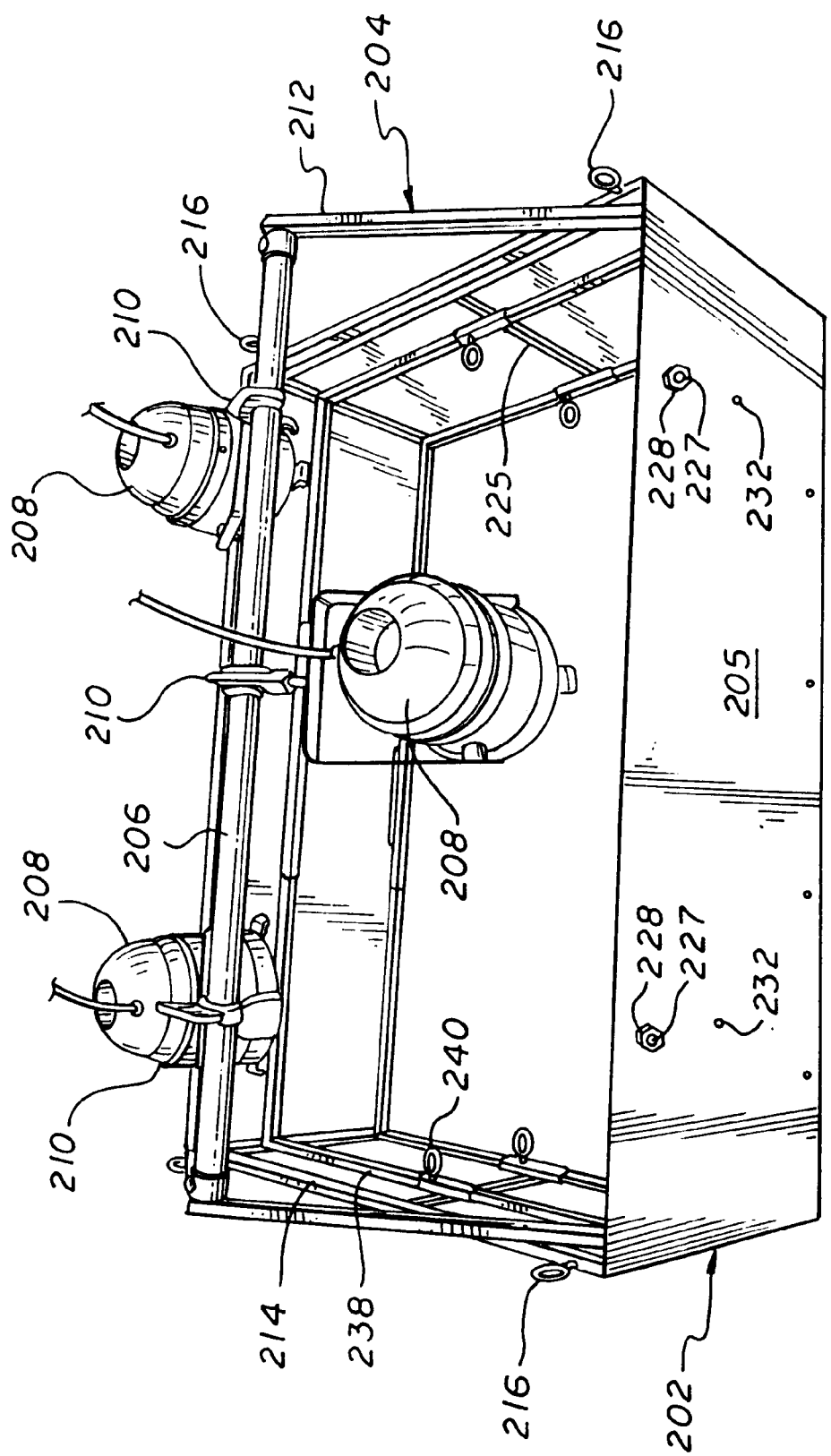
FIG. 24 is a rear perspective view of a lighting box for mounting above a set, stage or other area to be lit according to a fourth embodiment of the invention.
Figure 33:
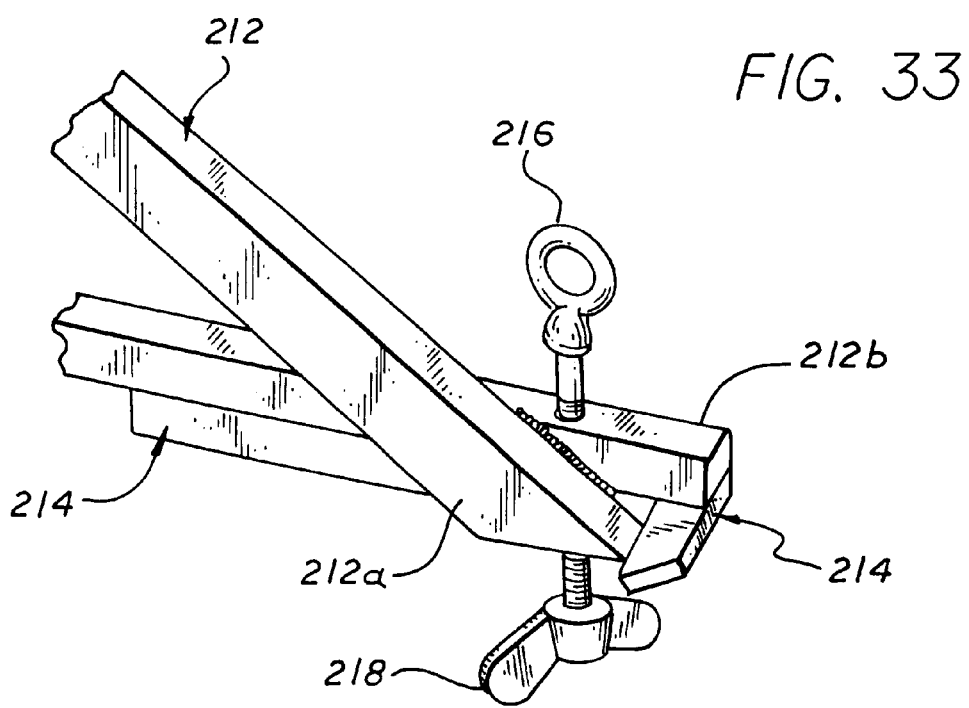
FIG. 33 is an enlarged view taken along circle 33 of the frame assembly of FIG. 28.

In FIG. 24, a fourth embodiment of the invention is shown, where a lighting box 202 is to be disposed overhead. In this embodiment, the box also includes a frame assembly 204, and a shell 205 mounted to the frame assembly. The frame assembly has a light mounting rod 206 or bar on which multiple lights 208 are mounted by C-clamps 210 or other connection. Rod 206 is connected to a triangle 212 in the same way as in the prior embodiments, e.g., by a pair of cups 207, welded or otherwise fixed to the triangle 212, and by cotter pins 209. The triangle 212 in turn is fastened to a rectangle 214 by screws or bolts or an otherwise readily disconnectable connection, as in prior embodiments. For example, with reference to FIGS. 28 and 33, triangle 212 has a cross-piece 212b welded to a side 212a of the triangle at each end of the cross-piece to 212b.

Figure 28:
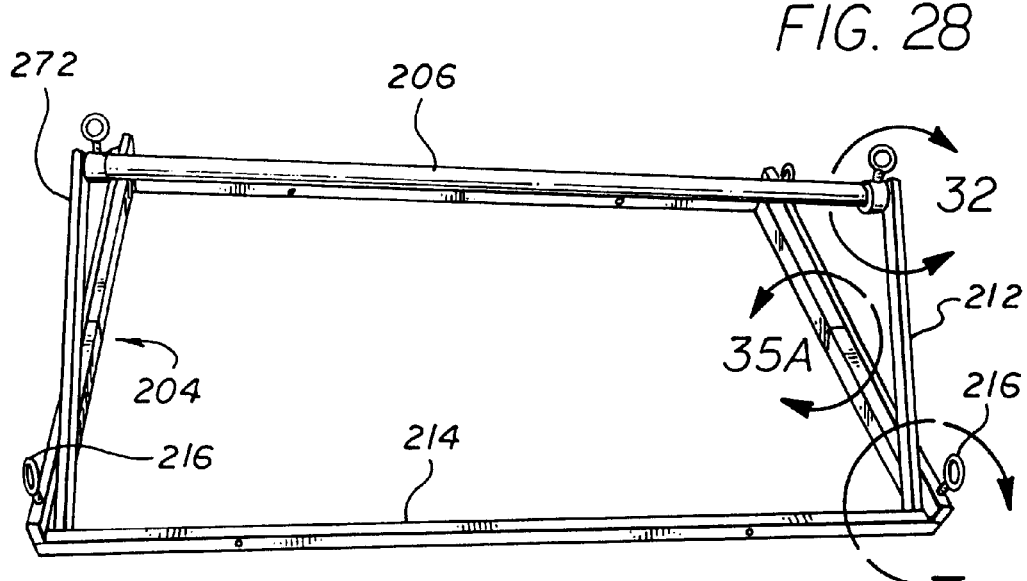
FIG. 28 is a perspective view of a frame assembly in the embodiment of FIG. 24.
Figure 29:
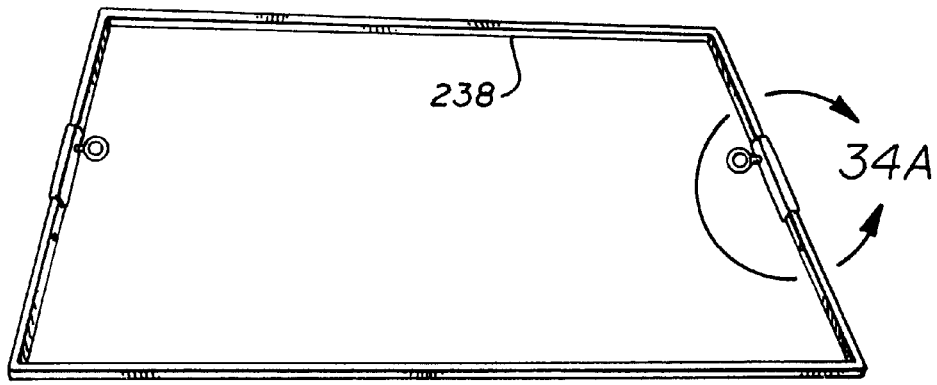
FIG. 29 is a perspective view of a gel frame for use in the box according to FIG. 24.
Figure 30:
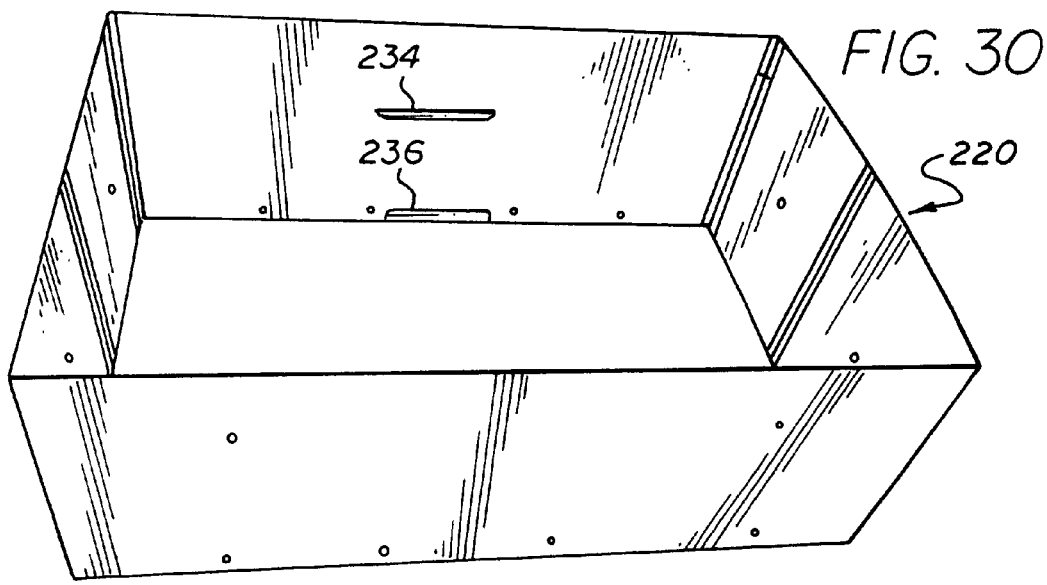
FIG. 30 is a perspective view of the shell of the box of FIG. 24.
Figure 31:
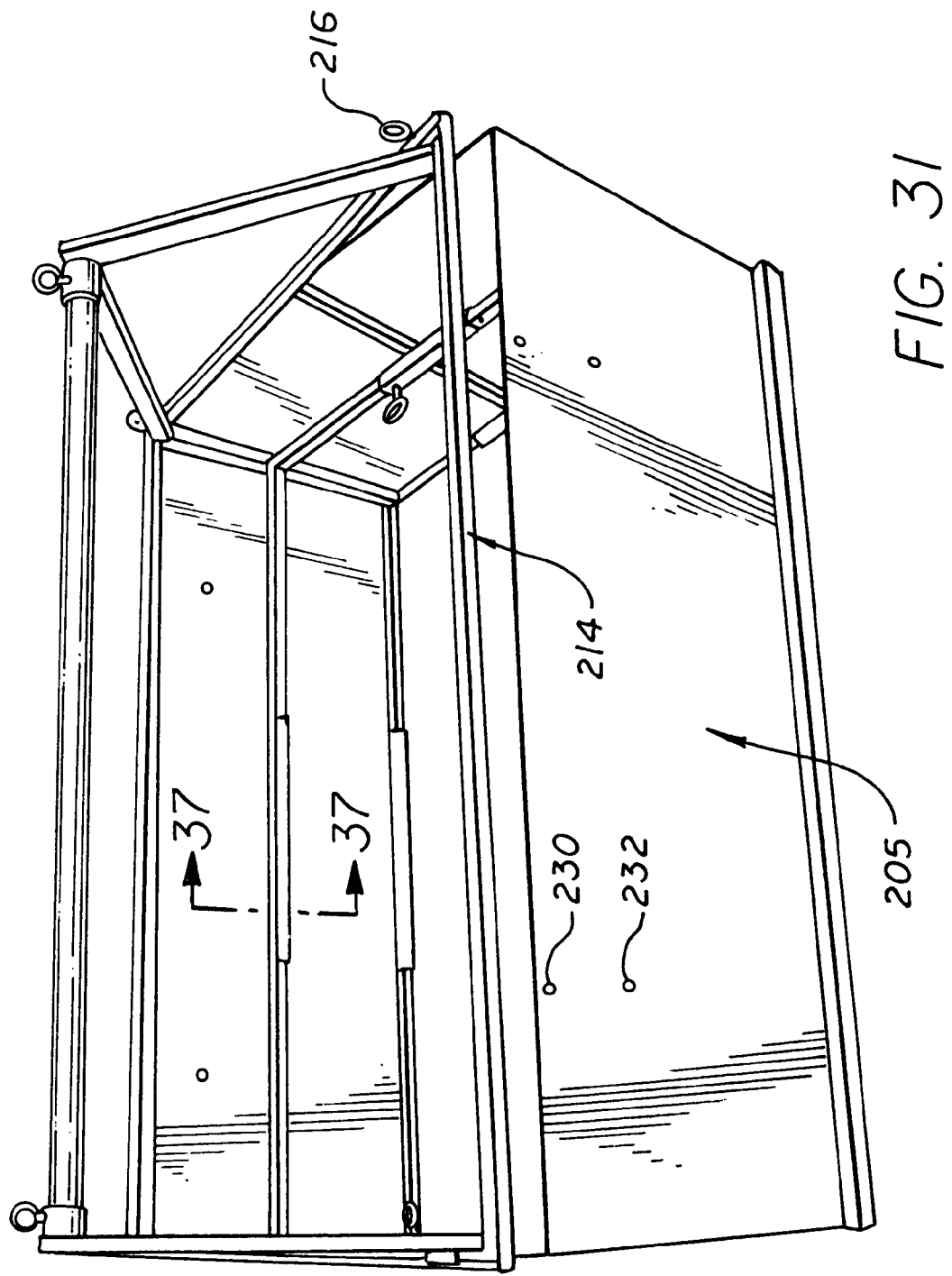
FIG. 31 is a rear perspective view of the box of FIG. 24 for purposes of explaining how a gel frame is held therein.
Figure 32:
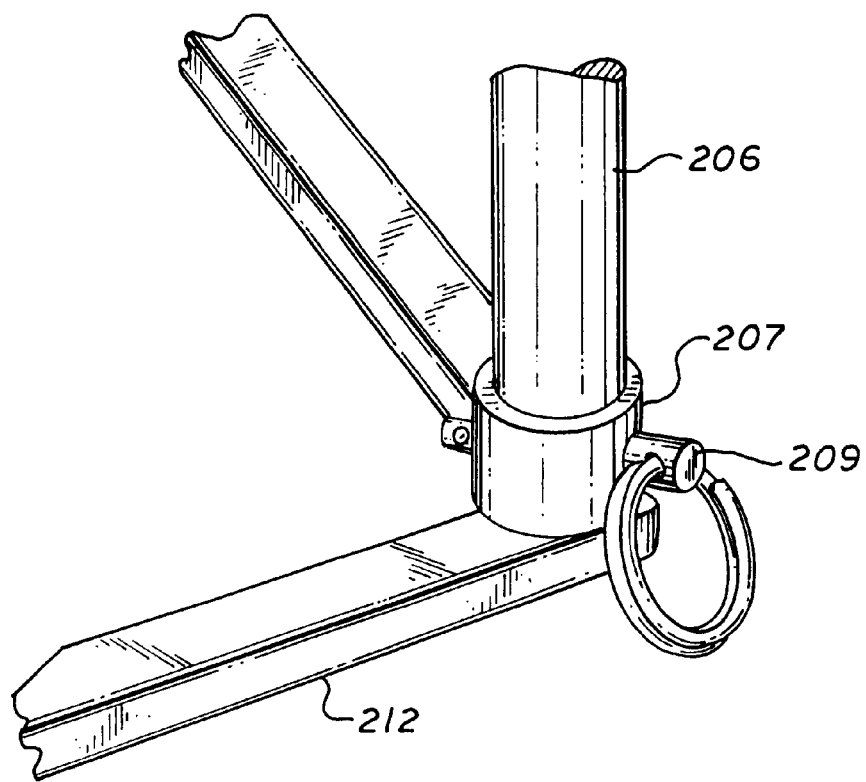
FIG. 32 is an enlarged view taken along circle 32 of the frame assembly of FIG. 28.
Figure 35:
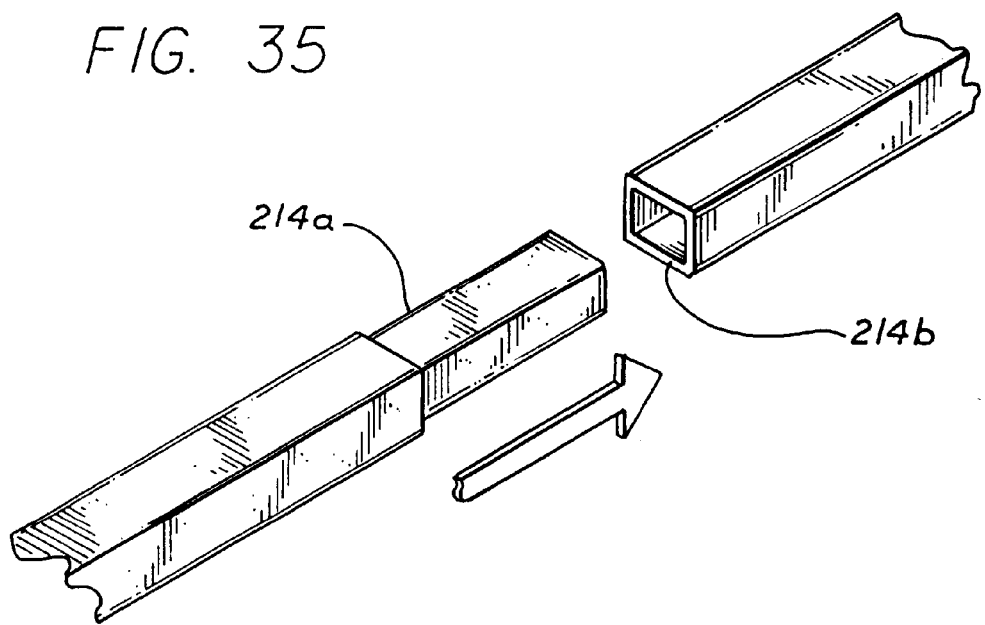
FIG. 35 is a disassembled view of a portion of a rectangular frame element in the frame assembly of FIG. 28.
Figure 35A:
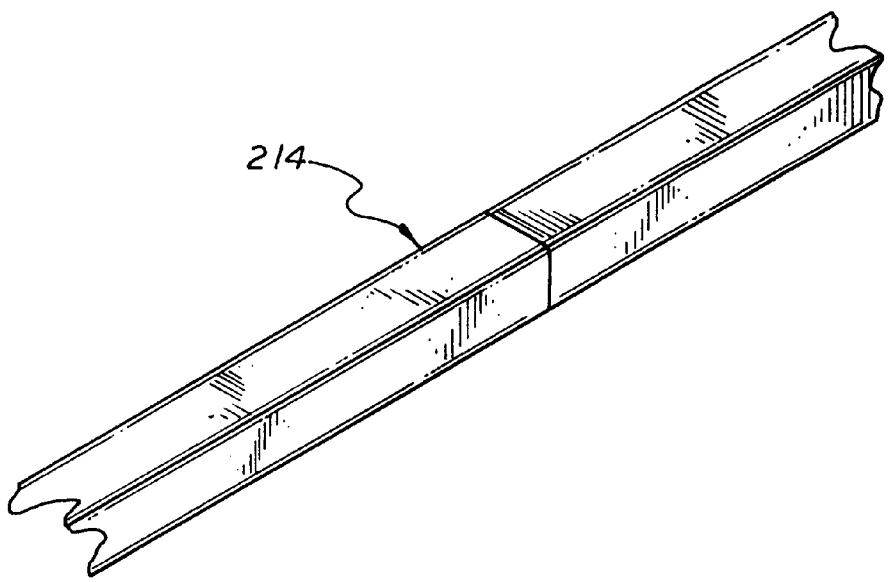
FIG. 35A is an assembled view of the same portion of the rectangular frame element taken along circle 35A of FIG. 28.

The triangle is connected to the rectangle by eyebolts, e.g., four eyebolts 216 located substantially at each corner of the triangle, and attached by wing nuts 218 (FIG. 33) to the rectangle's short side. The entire box may be suspended by the four eyebolts 216 using chain or the like. As shown in FIGS. 28, 35 and 35A, rectangle 214 is preferably formed in two pieces which fit together on the short sides by a tongue 214a press or friction fit into an opening 214b in square tubing forming rectangle 214.

Figure 27:
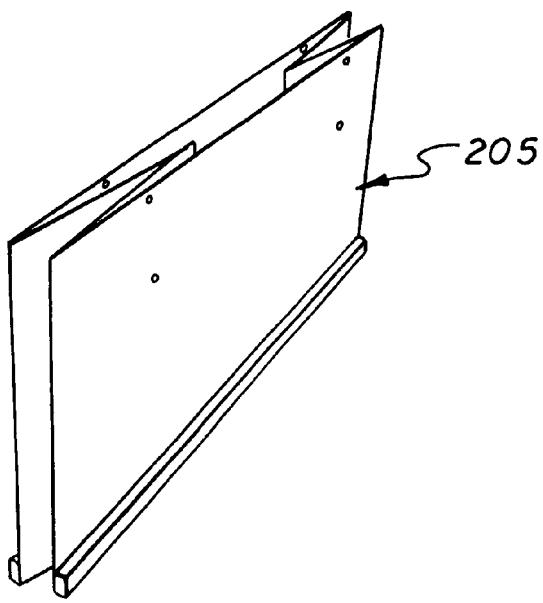
FIG. 27 is a perspective view of the shell in a folded state.
Figure 26:
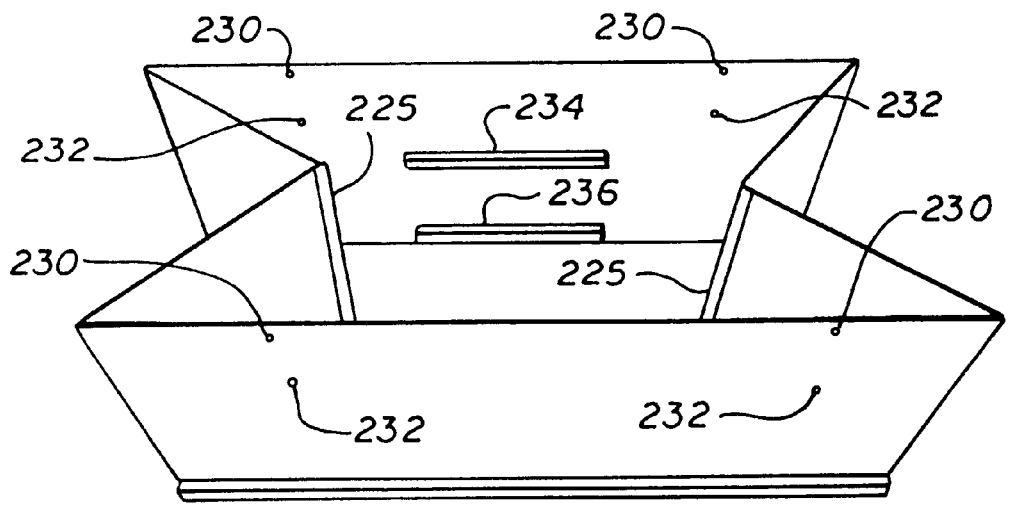
FIG. 26 is a perspective view of the shell in a partially folded state.
Figure 25:
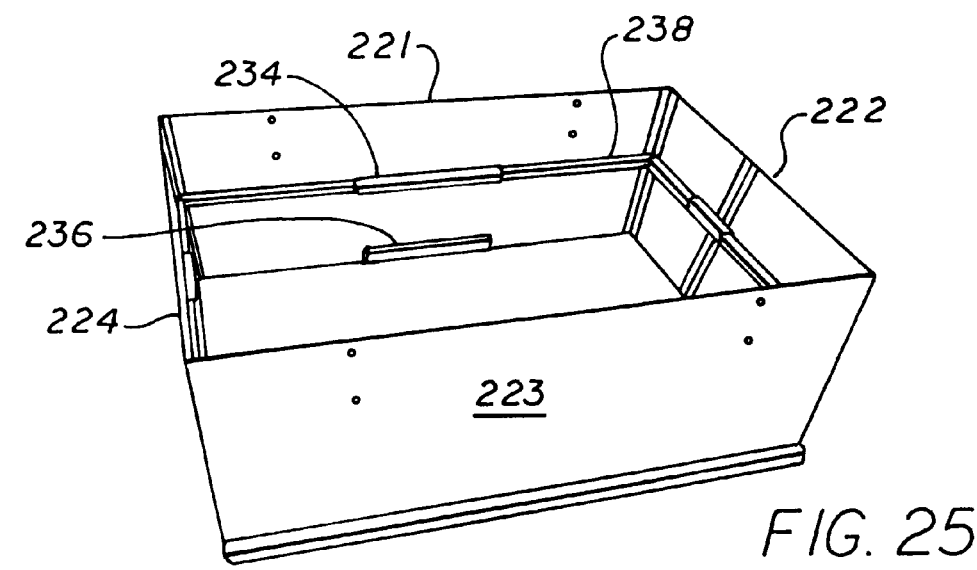
FIG. 25 is a perspective view of a shell of the box of FIG. 24.

Shell 205 has four sides 221, 222, 223 and 224. The two short sides 222, 224 have a piano hinge 225 at their midpoints, so that the shell 205 is collapsible as shown in FIGS. 26 and 27. As shown in FIG. 24, rectangle 214 fits inside shell 205 and shell 205 is fixed to frame 214 by bolts 227 and nuts 228, connected through holes 230 (FIG. 26). To make the depth dimension of the shell and frame smaller, an additional set of holes 232 may be provided, e.g., six inches from the first set 230.

Figure 37:
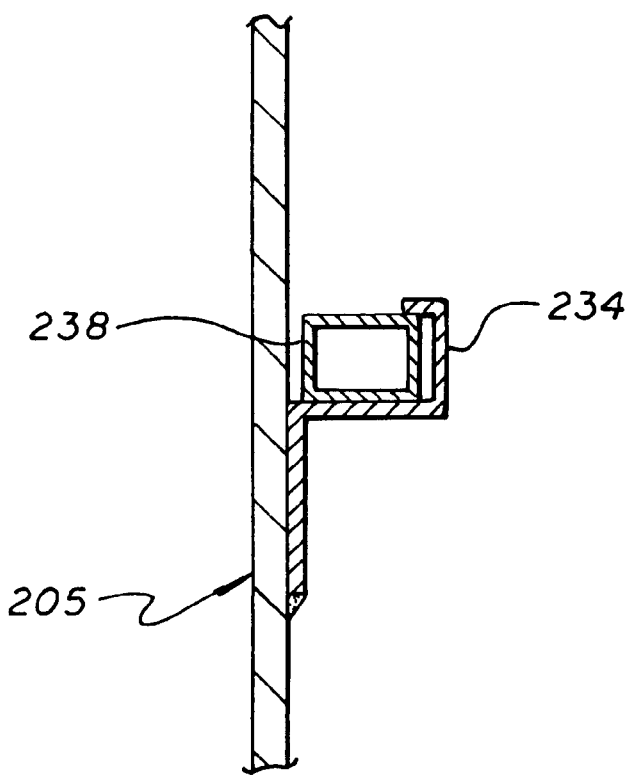
FIG. 37 is an enlarged sectional view taken along a line 37—37 of FIG. 31 to show how a diffusion frame is held in the box of FIG. 24.

The shell also has diffusion gel frame mounting elements 234, 236 for holding diffusion gel frames 238, 240. Each mounting element is contracted as shown in FIG. 37 for element 234, and is preferably welded to shell 205. Each gel frame is snapfitted into place, and supported on the mounting element. The embodiment as shown has two pairs of diffusion gel frame mounting elements 234, 236 on each long side 221, 223 of the shell. Each gel frame 238, 240 is preferably foldable on its short sides, e.g., by a hinge pin 240 and a cotter pin 242 fitted through mating holes 244, 246 as shown in FIGS. 34 and 34A. One part 238a of the gel frame fits into another part 238b. The short sides thus fold like the shell does (FIGS. 26–27).

Figure 36:
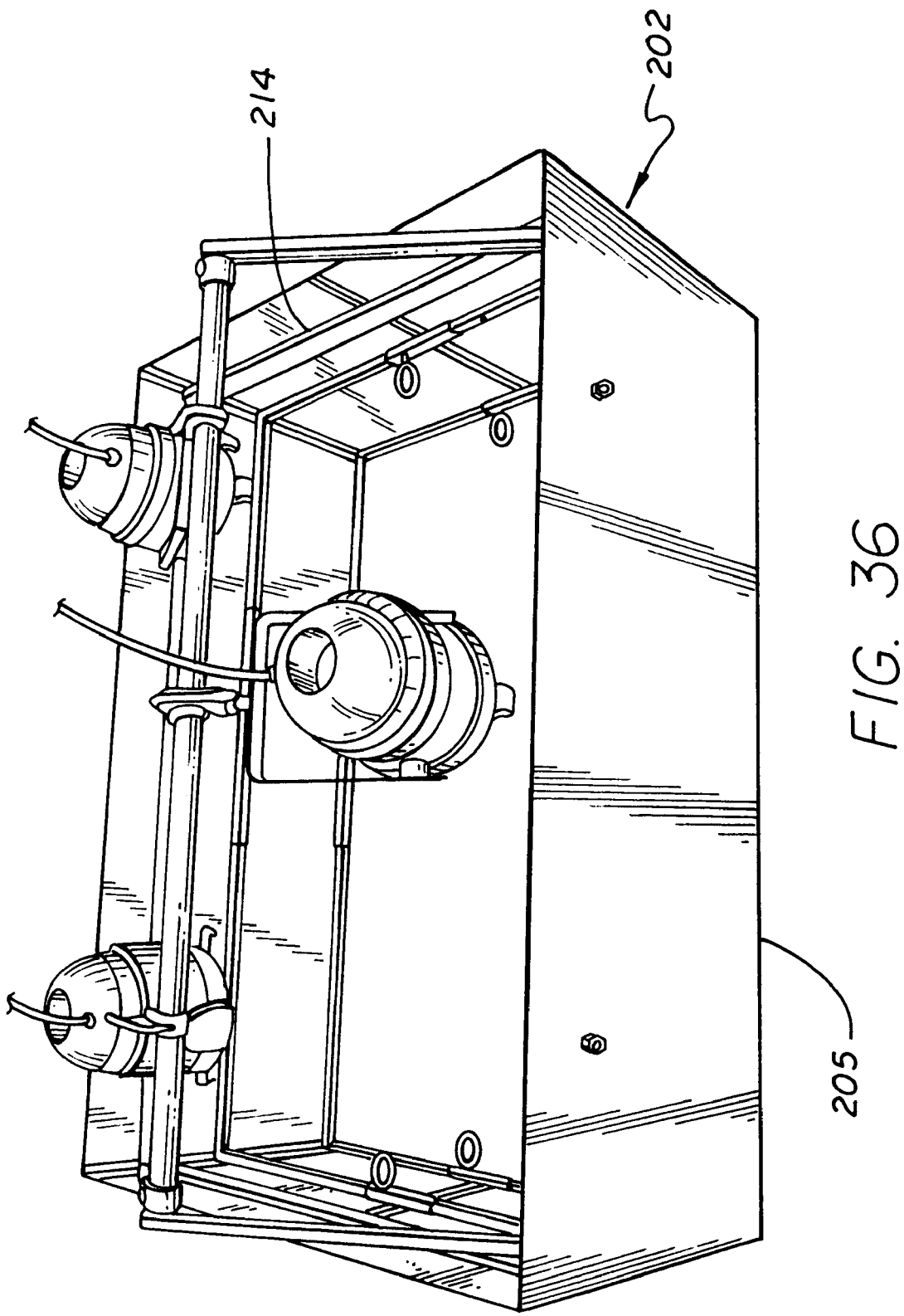
FIG. 36 is a rear perspective view of a box similar to that of FIG. 24 but with the frame assembly mounted further into the frame assembly shown in FIG. 24.

FIG. 36 shows the same box 202 as in FIG. 24, except that the rectangle 214 is bolted to the additional set of holes 232 set deeper into the shell 205.

Figure 39:
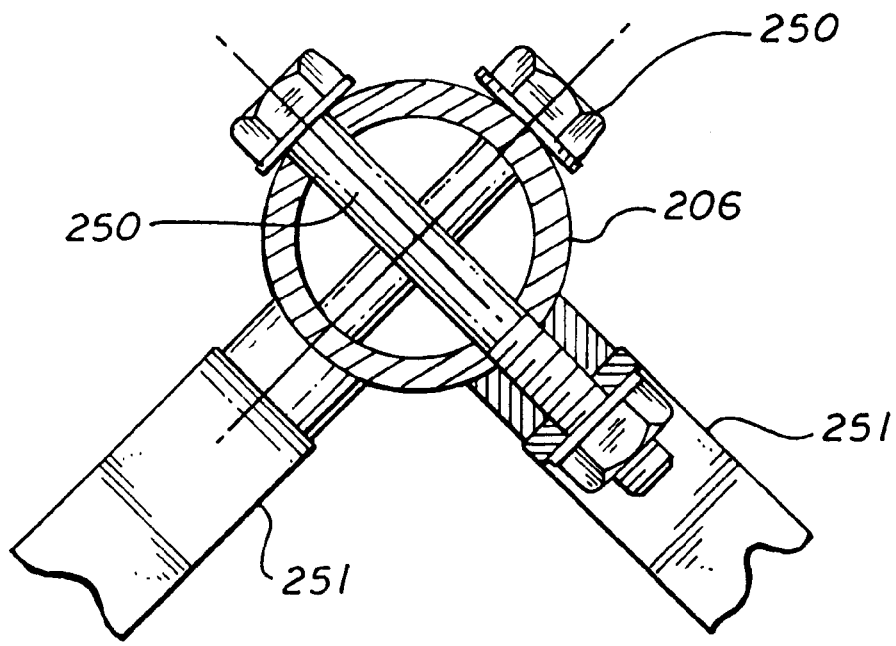
FIG. 39 is an enlarged sectional view taken along a line 39—39 of FIG. 38 to show how lights are connected to a rod for mounting lights.
Figure 38:
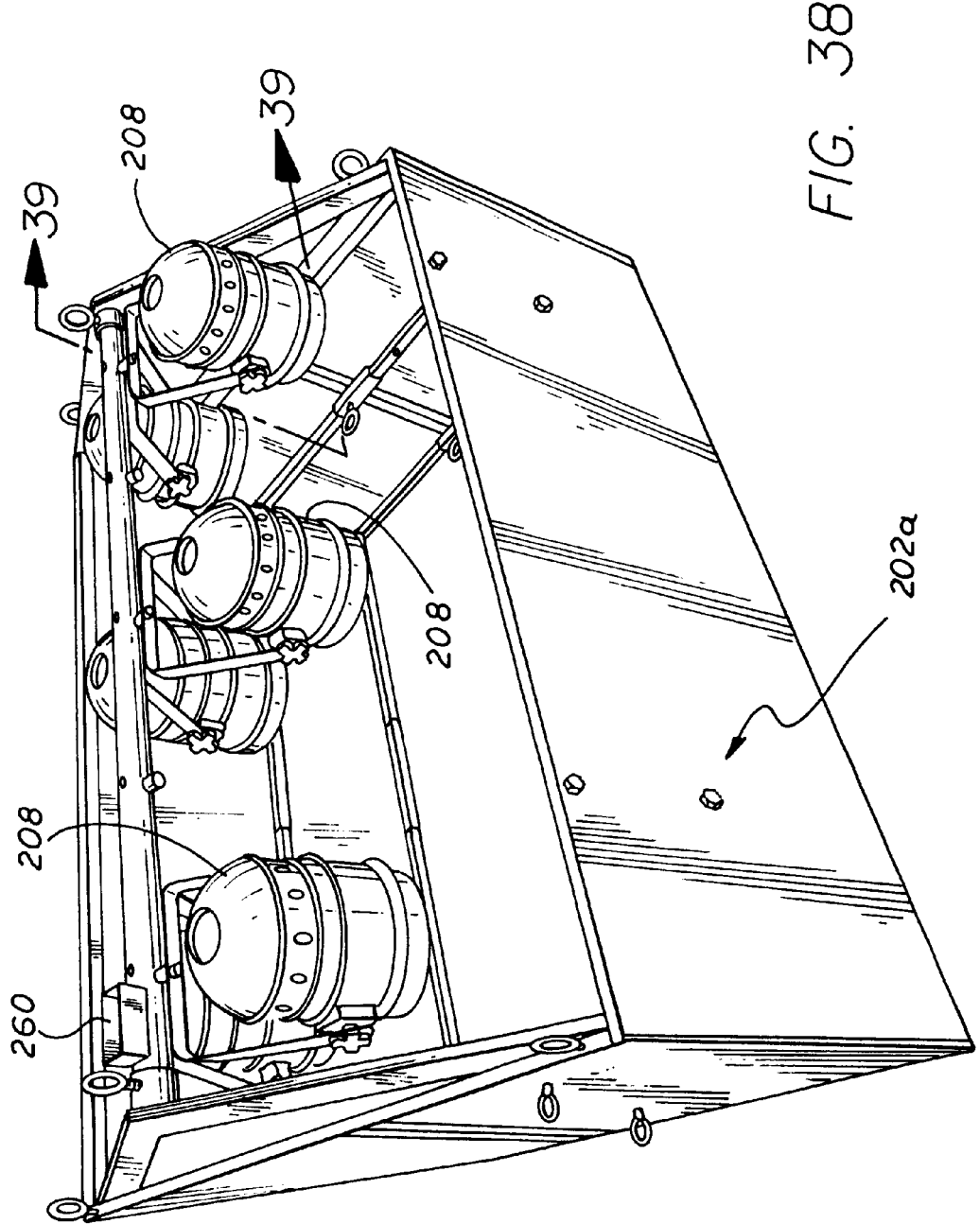
FIG. 38 is a rear perspective view of a lighting box similar to that of FIG. 24 but having lights fixed to a rod for mounting lights, and a connector for commonly wiring all of the lights.

FIG. 38 shows a box 202a which is a variation of box 202 of FIG. 24 having a Socopex™ connector box 260 or equivalent, i.e., a multiconnection electrical box connected to lights 208. The lights 208 each have a yoke 251 fastened to rod 206 by bolts 250 and nuts as shown in FIG. 39. This connection to rod or bar 206 is used in place of C-clamps or other readily removable attachments, because box 202a of FIG. 39 has lights 208 wired to connector box 260 which in turn may be connected to a multi-line cable, which in turn is connected to a light control panel known as a dimmer board. In this way, each individual light may be turned on, off, or dimmed. In, e.g., a six-light box held overhead, one can use four pars on the outside and two blue lights in the center. The blue will be used for "night" shots, four outside pars at full power for "day" shots, and at half power for "dusk" shots.

FIG. 40 shows a fifth embodiment. A box 270 is similar to box 202a of FIG. 38, but instead of rigid shell 205 it has a soft, collapsible shell 272 of, e.g., a dark or black fabric preferably with a silver or light interior. The fabric is fixed to triangle 214 by pins, adhesive or other means including removable and reattachable connections. In this embodiment, the gel frames 238, 240 are the same as in the previous embodiment, except that they are connected at their corners to a chain 274. With this structure, the entire box may be collapsed when not in use and take very little room. It is also extremely light. This box may utilize the chain and fabric because it is hung overhead. In a preferred embodiment, each top hanging box has ten lights, but many multiple light number arrangements are possible.

FIG. 41 shows a sixth embodiment which is similar to the box of FIG. 40. However, a box 280 has six par lamps in collars 282 located therein. In this embodiment, the lamps may be in collars to have a smaller depth and less weight. The lamp is held in the collar by a retaining ring (not shown) and there may also be a safety screen in front of each lamp (not shown). Because the cans are not used in this embodiment, a rear cover (described below) is used to protect against touching wiring and the hot lights. In addition, a front cover (to protect wiring)(not shown), may be used, and could be made of a thin sheet of aluminum with six round cut-outs for the collars.

It is noted that built-in lamps can also be used in the prior embodiments. Because these par lamps in collars have a low profile, they are set into the box and the box may have the rear cover 284 hinged to a rectangular frame 286. Frame 286 has four eyebolts 288 for hanging the box 280 and the bolts may also function to hold chain 294. The par collars 282 are directly connected to frame 286 by screws, bolts 289 or the like. The lights 282 are also connected to a Socoplex™ connector 290 or equivalent, by wires 291. The gel frames 292, 293 are similar to the embodiment of FIG. 24, but may collapse on the long sides as shown, and/or the short sides if desired. Moreover, the rectangle 286 (e.g., 20" by 40") may be smaller than the gel frames. The gel frames are held at their corners by chain 294. A fabric or flexible cover 295 may hang below the lower gel frame 293. The rear cover is preferably a metal, such as aluminum, and has perforations 298 for cooling/venting.

In place of the Socoplex™ connector, in this embodiment as well as others, toggle switches for each lamp may be placed on the side of the shell, along with a standard 3-pin connector for supplying power, e.g., 100A, to each lamp unit.

Figure 42:
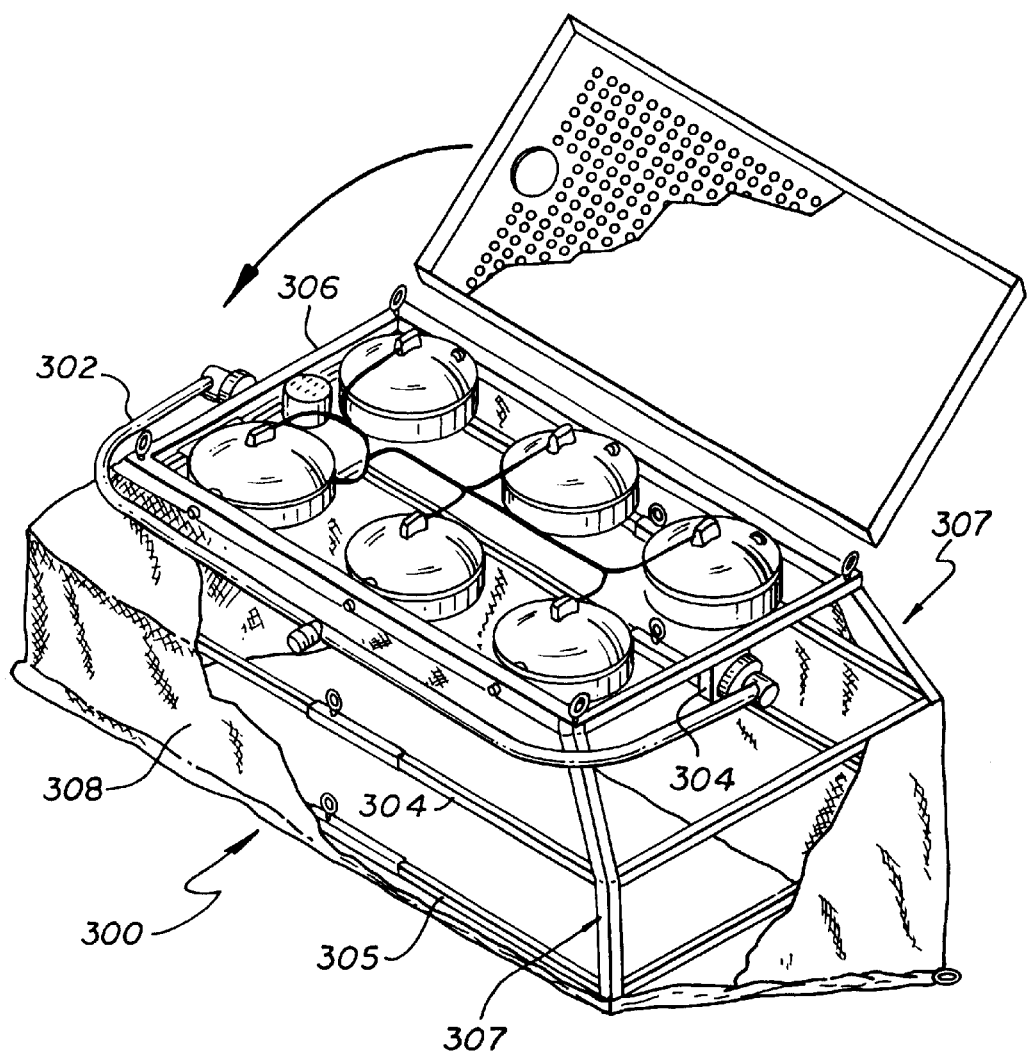
FIG. 42 is a rear perspective view of a lighting box similar to FIG. 41 but for mounting on a stand or mounting arm.

A box 300 of FIG. 42 according to a sixth embodiment is similar to box 280 of FIG. 41, but it has a yoke 302 hinged to a flange 304 of a rectangular frame 306. The yoke 302 operates the same as in the embodiment of FIG. 9. The gel frames 304, 305 are the same as in the previous embodiment, but are connected by rigid elements 307, e.g., square tube made out of aluminum. Cloth cover 308 extended at one long side to provide for an angled top as in other embodiments, but may also be made square. The gel frame 305 may accordingly also be angled to match or otherwise shaped to match the desired shape of collar 308. This box may be used in the same manner as the box of FIG. 9. Due to its rigid connector elements 307, it need not hang.

In the embodiments of FIGS. 41 and 42, with built-in pre-wired lamps, a protective aluminum sheet may be placed at the front face of the lamps, extending for the inner dimensions of the rectangle 286, and having circular cut-outs corresponding to each lamp face. Moreover, a mesh may be placed over each lamp face as a safety feature in the unlikely event of a blow-out.

In several embodiments, the invention provides the advantages of avoiding boom shadows and providing better sound by using closer booms, creating less heat for a higher light level, and making "actors' marks" less critical due to the large area of sufficient light. The invention may also avoid the need to refocus lights even if scene blocking changes. The invention further enables the use of inexpensive lights, such as par 64's, and provides a fully illuminated action area in which even a single lamp burnout is not critical. The modularity of the invention enables multiple boxes to be used side-to-side like a single large unit. The boxes may also be hung from a single point or multiple points.

The device provides a wide variety of light levels, creates a mood, enhances special lighting and works for daylight, sunset, night shots and more.

The device may be constructed with aircraft quality aluminum such as 6061T6. Inside surfaces are preferably reflective metal. Light mount and support brackets are preferably welded tubular aluminum construction with a 1½ inch or 1⅝ inch outside diameter pipe for direct fixture mounting.

The box is hinged and foldable. Access to diffusion/color frame slots is from the bottom via a hinged door with quarter turn fasteners. The device when opened will measure approximately 4×4×4 feet and weigh less than 100 pounds.

For mounting purposes, there are three slotted grooves for C-clamps. C-clamps may be mounted in various positions to accommodate balance and angle.

The box can be folded for storage and transportation. In the folded position, the box will measure approximately 4×4 feet×5 inches. Light mounting rails and braces can be stored flat for space saving and ease of transportation.

Soft lights or bounce lights are often used to eliminate shadows. However, they have one great deficiency: as the distance from this light grows, the light fall off is extreme. When light levels in the upstage production areas are inadequate, additional lighting equipment must be added. These added lights cause problems, particularly for microphones and booms. The box was designed to solve this problem, enabling the user to have a more even light level from front to back. The box helps eliminate additional lighting equipment and the boom problems (both access and shadow) that they create in the upstage areas.

The box theory is that a soft projected front light is flattering to actors and eliminates boom shadows. All action areas are lit so new blocking does not call for refocus. Since the multiple sources are used for key, there is not waiting to change burnouts. The box is a fast, cost-effective lighting method that looks great.

In the overhead box embodiments, where ten 1000 watt par cans are used and the box is mounted eleven feet above an area to be lit, such as a boxing ring (20'×20'), a soft even 300 f.c. light is produced over the entire area. Multiple mounting holes allow for a 1×2 inch wood strip to be fixed to the box so that a duvatine skirt may be added to block the spill. The skirt can be black, reflective or diffusing.

Like the other boxes, the overhead version is hinged and foldable for easy, convenient transportation and storage. Access to diffusion/color frame slots is from the bottom, where they snap in place. When fully opened, the box measures 40×60 inches and provides two diffusion/color frame slots.

The invention enables the inexpensive lights to be separated and spaced from one another, preferably a distance of equal to or about the diameter of each light. For example, in a 40" long box, three par cans of diameters of 8" may be placed 8" apart. Six 1000 watt pars can be used to obtain more light, e.g., twice as much light as a 10,000 watt fresnel light when projected through the diffusion elements, yet still weigh much less and cost much less than that single fresnel.

The boxes, when used modularly or collectively, achieve a very desirable lighting effect, and thus it is preferable to form them such that they can be placed side to side, e.g., by using sides 4, 6.

Although the boxes are constructed primarily of aluminum, they may be constructed of any other reasonable material including wood, plastic, foamcore, or fabric on a frame, and may even be disposable. The boxes are, as shown in the preferred embodiment, preferably readily enabled to be disassembled and folded, although other embodiments where the boxes are not readily disassembled can be envisioned. In addition, for example, the bar 14 need not be mounted to V-bracket members, and may instead be directly or more directly mounted to the housing of the box. The box or boxes need not be mounted to a green bed, and may be hung from or mounted on pipe, or otherwise mounted, hung or used.

As noted above, a significant advantage of the box is that it creates a soft projected light from inexpensive but powerful and efficient lighting elements, e.g., pars. A further advantage of pars is that they are available in a variety of intensities, e.g., 200 W and 500 W, as well as 1000 W, and a variety of circumferences and intensities. Where lower power pars, e.g., 200 W and 500 W, are used, the box may be scaled down in size accordingly.

While the present invention has been described with regards to particular embodiments, it is recognized that additional variations of the present invention may be devised without departing from the inventive concept.

What is claimed is:

1. A lighting projection device for controlling and directing light from multiple lights, the lighting projection device comprising:
   (i) a housing having multiple sides and a front, wherein the sides are adjacent one another;
   (ii) a frame for supporting the housing, the frame comprising lamp holding means for receiving and holding multiple par lamps;
   (iii) multiple par lamps supported in the lamp holding means; and
   (iv) means in the housing for supporting a primary diffusion element holder proximate the front of the housing, whereby when a primary diffusion element is disposed in the primary diffusion element holder, light diffusion will be provided for converting light from the par lamps directed thereat to a soft diffused projected light.

2. The lighting device of claim 1 wherein there are at least six par lamps mounted in the lamp holding means and positioned in rows and columns each having at least two par lamps.

3. The lighting device of claim 1 further comprising means for connecting sides of the frame for folding with respect to each other so as to fold to a planar form.

4. The lighting device of claim 1, wherein the housing comprises a fabric material.

5. The lighting device of claim 1, wherein the housing comprises a duvatine skirt.

6. The lighting device of claim 1, wherein the primary diffusion element holder comprises a rigid rectangular member.

7. The lighting device of claim 1, wherein the housing is enclosed at the sides at least from a position proximate the front of the par lamps to the front of the housing.

8. The lighting device of claim 1, wherein the housing has an inner surface comprising a reflective material.

9. The lighting device of claim 1, further comprising means attached to the frame for suspending the lighting device.

10. The lighting device of claim 1, wherein the sides extend at least from the frame to the primary diffusion element holder.

11. The lighting device of claim 1, wherein the sides enclose light from the par lamps such that the light only passes through the primary diffusion element holder.

12. The lighting device of claim 1, further comprising means for providing access to said primary diffusion element holder for removing and replacing said primary diffusion element holder.

13. The lighting device of claim 1, further comprising means attached to the frame for suspending the lighting device.

14. The lighting device of claim 1, wherein the frame has four corners proximate a rear thereof, and further comprising means attached to the frame at four points proximate the four corners thereof, respectively, for hanging the lighting device.

15. The lighting device of claim 1, further comprising a yoke attached to the frame for pivotably holding the lighting device.

16. The lighting device of claim 1, wherein the frame has built-in par lamps disposed therein.

17. The lighting device of claim 16, wherein the par lamps are wired individual to a multiple pin connector for individual control of each of the par lamps.

18. The lighting device of claim 1, wherein a primary diffusion element is disposed in the primary diffusion element holder.

19. The lighting device of claim 18, wherein the primary diffusion element is a material that diffuses the light from the par lamps.

20. The lighting device of claim 18, wherein the primary filter element is a material that alters the color of the light from the par lamps.

21. The lighting device of claim 1, further comprising a secondary diffusion element holder, wherein the secondary diffusion element holder is supported in the housing proximate the front such that, when diffusion elements are mounted in the primary diffusion element holder and the secondary diffusion element holder, light produced by the plurality of par lamps is directed therethrough.

22. The lighting device of claim 21, wherein a primary diffusion element is disposed in the primary diffusion element holder and a secondary diffusion element is disposed in the secondary diffusion element holder.

23. The lighting device of claim 22, wherein the secondary diffusion element is a material that diffuses the light from the par lamps.

24. The lighting device of claim 22, wherein the secondary diffusion element is a material that alters the color of the light from the par lamps.

25. The lighting device of claim 1, wherein the frame comprises a member having a rectangular cross section with the par lamps disposed inside the rectangular member.

26. The lighting device of claim 25, wherein the par lamps each comprise a collar fixed to the rectangular member and a par light disposed in the collar.

27. The lighting device of claim 25, wherein the means for supporting the primary diffusion element holder comprises one of rigid bars and chains connected to the frame.

28. The lighting device of claim 26, further comprising means for protecting a user from heat generated by the par lamps disposed on a side of the par lamps opposite to the front of the housing.

29. The lighting device of claim 28, wherein the means for protecting comprises a cover.

30. The lighting device of claim 29, wherein the cover has perforations.

31. A lighting device for lighting by front projection lighting a stage or set, the lighting device comprising:
   a housing having multiple adjacent sides and a front;
   a frame for mounting the housing and comprising lamp holding means for supporting multiple par lamps;
   at least two diffusion element holders mounted in the housing spaced from one another and proximate the front of the housing and in front of the lamp holding means; and multiple par lamps mounted in the lamp holding means to shine light through the diffusion element holders, whereby the multiple par lamps provide soft projected diffused light from the lighting device for lighting a stage or set when diffusion elements are provided in the diffusion element holders.

32. The lighting device of claim 1, wherein there are at least six par lamps mounted in the lamp holding means and positioned in rows and columns each having at least two par lamps.

33. The lighting device of claim 31 further comprising means for connecting sides of the frame for folding with respect to each other so as to fold to a planar form.

34. The lighting device of claim 31, wherein the housing comprises a fabric material.

35. The lighting device of claim 31, wherein the housing comprises a duvatine skirt.

36. The lighting device of claim 31, wherein the primary diffusion element holder comprises a rigid rectangular member.

37. The lighting device of claim 31, wherein the housing is enclosed at the sides at least from a position proximate the front of the par lamps to the front of the housing.

38. The lighting device of claim 37, wherein the housing has an inner surface comprising a reflective material.

39. The lighting device of claim 37, further comprising means attached to the frame for suspending the lighting device.

40. The lighting device of claim 37, wherein the sides extend at least from the frame to the primary diffusion element holder.

41. The lighting device of claim 37, wherein the sides enclose light from the par lamps such that the light only passes through the diffusion element holders.

42. The lighting device of claim 37, further comprising means for providing access to the diffusion element holders for removing and replacing the diffusion element holders.

43. The lighting device of claim 37, further comprising means attached to the frame for suspending the lighting device.

44. The lighting device of claim 37, wherein the frame has four corners proximate a rear thereof, and further comprising means attached to the frame at four points proximate the four corners thereof, respectively, for hanging the lighting device.

45. The lighting device of claim 37, further comprising a yoke attached to the frame for pivotably holding the lighting device.

46. The lighting device of claim 37, wherein the frame has built-in par lamps disposed therein.

47. The lighting device of claim 46, wherein the par lamps are wired individually to a multiple pin connector for individual control of each of the par lamps.

48. The lighting device of claim 37, further comprising means for supporting the diffusion element holders on the frame.

49. The lighting device of claim 48, wherein the means for supporting the diffusion element holders comprises one of rigid bars and chains connected to the frame.

50. The lighting device of claim 37, wherein a primary diffusion element is disposed in one of the diffusion element holders and a secondary diffusion element is disposed in the other of the diffusion element holders.

51. The lighting device of claim 50, wherein the primary and secondary diffusion elements are a material that diffuses the light from the par lamps.

52. The lighting device of claim 50, wherein the primary and secondary diffusion elements are a material that alters the color of the light from the par lamps.

53. The lighting device of claim 37, wherein the frame comprises a member having a rectangular cross section with the par lamps disposed inside the rectangular member.

54. The lighting device of claim 53, wherein the par lamps each comprise a collar fixed to the rectangular member and a par light disposed in the collar.

55. The lighting device of claim 54, further comprising means for protecting a user from heat generated by the par lamps disposed on a side of the par lamps opposite to the front of the housing.

56. The lighting device of claim 54, wherein the means for protecting comprises a cover.

57. The lighting device of claim 56, wherein the cover has perforations.

58. A method of lighting a stage or set using at least one lighting device, wherein the lighting device comprises a housing a contiguous closed portion and a front, and means for mounting at least four par lamps, the method comprising the steps of:
(i) providing a diffusion frame with a diffusion element proximate the front of the housing;
(ii) providing a frame for holding the at least four par lamps therein and for supporting the housing;
(iii) positioning the frame with the at least four par lamps proximate a rear of the housing directed towards the diffusion element at the front of the housing, with the housing being enclosed at least from the par lamps to the diffusion element;
(iv) diffusing light from each of the at least four par lamps using the diffusion element; and
(v) using the diffused light exiting the diffusion element to illuminate at least part of a stage or set.

59. The method of claim 58, further comprising a step of using lighting devices as a primary means of lighting a set.

60. The method of claim 58, further comprising a step of positioning the lighting device at a front of the set to illuminate the set from the front.

61. A lighting device for directing and controlling light from at least four nonfocusable par lamps, the lighting device comprising:
a housing having four sides, a front and a back;
at least four par lamps;
a rigid member for mounting the par lamps in the housing, and for mounting the housing;
primary means for diffusing light from the multiple par lamps, the primary means for diffusing disposed proximate the front of the housing for forming a soft, projected and diffused light from the par lamps when disposed in the housing and directed at the primary means for diffusing.

62. The lighting device of claim 61, wherein there are at least six par lamps mounted in the lamp holding means and positioned in rows and columns each having at least two par lamps.

63. The lighting device of claim 61, further comprising means for connecting sides of the frame for folding with respect to each other so as to fold to a planar form.

64. The lighting device of claim 61, wherein the housing comprises a fabric material.

65. The lighting device of claim 61, wherein the housing comprises a duvatine skirt.

66. The lighting device of claim 61, further comprising frame means for supporting the primary means for diffusing.

67. The lighting device of claim 61, wherein the housing is enclosed at the sides at least from a position proximate the front of the par lamps to the front of the housing.

68. The lighting device of claim 61, wherein the housing has an inner surface comprising a reflective material.

69. The lighting device of claim 61, further comprising means attached to the frame for suspending the lighting device.

70. The lighting device of claim 61, wherein the sides extend at least from the frame to the primary diffusion element holder.

71. The lighting device of claim 61, wherein the sides enclose light from the par lamps such that the light only passes through the primary diffusion element holder.

72. The lighting device of claim 61, further comprising means for providing access to said primary means for diffusing for removing and replacing said primary means for diffusing.

73. The lighting device of claim 61, further comprising means attached to the frame for suspending the lighting device.

74. The lighting device of claim 61, wherein the frame has four corners proximate a rear thereof, and further comprising means attached to the frame at four points proximate the four corners thereof, respectively, for hanging the lighting device.

75. The lighting device of claim 61, further comprising a yoke attached to the frame for pivotably holding the lighting device.

76. The lighting device of claim 61, wherein the frame has built-in par lamps disposed therein.

77. The lighting device of claim 76, wherein the par lamps are wired individually to a multiple pin connector for individual control of each of the par lamps.

78. The lighting device of claim 61, further comprising secondary means for diffusing light from the par lamps after the light passes through the primary means, wherein the secondary means is supported in the housing proximate the front.

79. The lighting device of claim 78, wherein there are two diffusion element holders for holding the primary and secondary means for diffusing in the housing.

80. The lighting device of claim 61, wherein the frame comprises a member having a rectangular cross section with the par lamps disposed inside the rectangular member.

81. The lighting device of claim 80, wherein the par lamps each comprise a collar fixed to the rectangular member and a par light disposed in the collar.

82. The lighting device of claim 81, further comprising means for protecting a user from heat generated by the par lamps disposed on a side of the par lamps opposite to the front of the housing.

83. The lighting device of claim 82, wherein the means for protecting comprises a cover.

84. The lighting device of claim 83, wherein the cover has perforations.

\* \* \* \* \*

(12) INTER PARTES REEXAMINATION CERTIFICATE (947th)
United States Patent
Finn et al.

(10) Number: US 6,719,434 C1
(45) Certificate Issued: *Aug. 27, 2014

(54) FOLDABLE LIGHT DIFFUSION BOX WITH FRAME ASSEMBLY

(75) Inventors: Bruce L. Finn, Malibu, CA (US); Robert E. Lee, Topanga, CA (US)

(73) Assignee: Bruce L. Finn, Malibu, CA (US)

Reexamination Request:
No. 95/000,383, Oct. 23, 2008

Reexamination Certificate for:
Patent No.: 6,719,434
Issued: Apr. 13, 2004
Appl. No.: 09/704,639
Filed: Nov. 1, 2000

( * ) Notice: This patent is subject to a terminal disclaimer.

Related U.S. Application Data

(63) Continuation-in-part of application No. 09/642,315, filed on Aug. 21, 2000, now Pat. No. 6,588,912, which is a continuation of application No. 09/146,063, filed on Sep. 2, 1998, now Pat. No. 6,106,125.

(51) Int. Cl.
*G03B 15/06* (2006.01)
*G03B 15/02* (2006.01)

(52) U.S. Cl.
USPC .............................. 362/11; 362/355; 362/367

(58) Field of Classification Search
None
See application file for complete search history.

(56) References Cited

To view the complete listing of prior art documents cited during the proceeding for Reexamination Control Number 95/000,383, please refer to the USPTO's public Patent Application Information Retrieval (PAIR) system under the Display References tab.

*Primary Examiner* — Deandra Hughes

(57) ABSTRACT

A lighting project or device has a housing having multiple adjacent sides and a front, the housing being enclosed at least between par lamp and the diffusion element. Multiple par lights are mounted to a frame and positioned to send light out the front of the device. The box also has a diffusion element (frame) disposed proximate its front end, and even may have multiple elements preferably spaced apart. The element or elements receive the light from the par lighting instruments and diffuse it to provide a soft projected light from the device. In accordance with one aspect of the invention, this light may be used to provide diffused light as part of the key lighting for a stage or set, and may provide such soft projected lighting from a front (downstage) of the stage or set. The frame also supports the housing. The frame may be rectangular. The device may also have a soft shell, may hang overhead, on a stand or by a rotatable yoke, and may have lights fixed therein. The device may also have a rear cover.

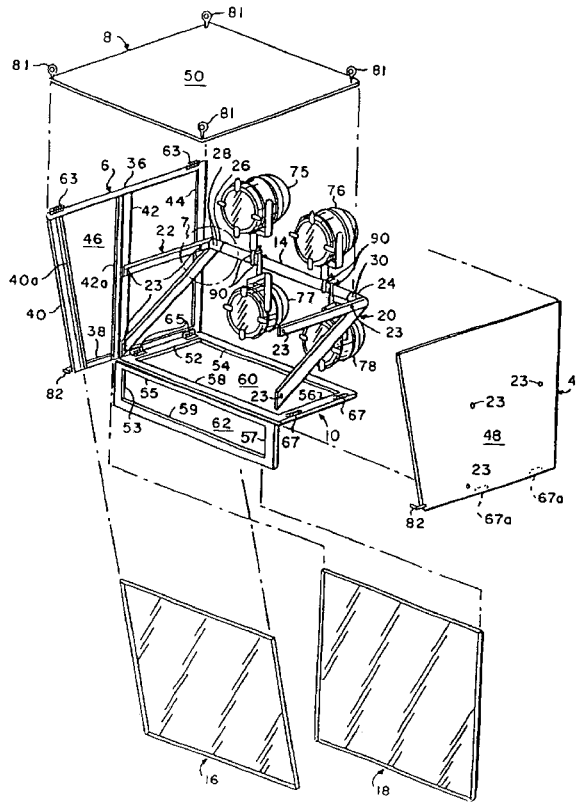

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-26, 28-48 and 50-84 are cancelled.

Claims 27 and 49 were not reexamined.

\* \* \* \* \*